United States Patent
Takahashi et al.

(10) Patent No.: US 8,307,935 B2
(45) Date of Patent: Nov. 13, 2012

(54) VEHICLE POP UP HOOD APPARATUS

(75) Inventors: Hiroyuki Takahashi, Aichi (JP); Hitoshi Yuasa, Toyota (JP); Yukio Nakagawa, Toyota (JP); Kazuyuki Yoshiyama, Aichi (JP); Shigeyuki Suzuki, Aichi (JP); Takeki Hayashi, Aichi (JP); Hajime Kitte, Aichi (JP); Masashi Aoki, Aichi (JP); Toshikatsu Togawa, Aichi (JP); Toshinobu Tsuboi, Ogaki (JP); Shinji Mori, Ogaki (JP)

(73) Assignees: Toyota Jidosha Kabushiki Kaisha, Toyota (JP); Toyoda Gosei Co., Ltd., Kiyosu (JP); Pacific Industrial Co., Ltd., Ogaki (JP)

( * ) Notice: Subject to any disclaimer, the term of this patent is extended or adjusted under 35 U.S.C. 154(b) by 112 days.

(21) Appl. No.: 12/864,365

(22) PCT Filed: Jan. 22, 2009

(86) PCT No.: PCT/JP2009/050976
§ 371 (c)(1),
(2), (4) Date: Oct. 5, 2010

(87) PCT Pub. No.: WO2009/093656
PCT Pub. Date: Jul. 30, 2009

(65) Prior Publication Data
US 2011/0031056 A1    Feb. 10, 2011

(30) Foreign Application Priority Data
Jan. 25, 2008    (JP) .................. 2008-015610

(51) Int. Cl.
*B60R 21/34*    (2006.01)

(52) U.S. Cl. ...................................................... 180/274
(58) Field of Classification Search .................. 180/274; B60R 21/34
See application file for complete search history.

(56) References Cited

U.S. PATENT DOCUMENTS 6,364,402 B1 *    4/2002    Sasaki ................... 296/187.09
(Continued)

FOREIGN PATENT DOCUMENTS

JP    11-115680    4/1999
(Continued)

OTHER PUBLICATIONS

"Notice of Reasons for Rejection" in JP 2008-015610; Mailing Date: Mar. 3, 2009.
(Continued)

*Primary Examiner* — Eric Culbreth
*Assistant Examiner* — Nicole Verley
(74) *Attorney, Agent, or Firm* — Oliff & Berridge, PLC

(57) ABSTRACT

In a vehicle pop-up hood apparatus in which a rod is extended and a hood is pushed up by the operation of an actuator at a time of collision with a collision body, collision energy is absorbed with high efficiency when a collision load of a predetermined value or greater is input to an area near a hood pushed up position.

Actuator (18) operates such that rod (20) moves in an axial direction toward a hood upper side, pushes up a rear edge side of hood rocker (12) and holds it at that position and, in that state, when a collision load of a predetermined value or greater acts from a hood upper side to near the pushed up position of the hood, push portion (54) slides along pushed up surface (38) of hinge arm (30) towards a vehicle rear side, and rod (20) is made to bend in conjunction therewith.

42 Claims, 21 Drawing Sheets

U.S. PATENT DOCUMENTS

| | | | |
|---|---|---|---|
| 6,510,914 B2* | 1/2003 | Ishizaki et al. | 180/274 |
| 6,520,276 B2* | 2/2003 | Sasaki et al. | 180/274 |
| 6,530,449 B2* | 3/2003 | Sasaki et al. | 180/274 |
| 6,554,093 B2* | 4/2003 | Sasaki et al. | 180/274 |
| 6,834,735 B2* | 12/2004 | Kim | 180/69.21 |
| 6,938,715 B2* | 9/2005 | Hamada et al. | 180/274 |
| 7,000,720 B2* | 2/2006 | Polz et al. | 180/69.21 |
| 7,293,624 B2* | 11/2007 | Adachi | 180/274 |
| 7,303,040 B2* | 12/2007 | Green et al. | 180/274 |
| 7,374,008 B1* | 5/2008 | Neal et al. | 180/274 |
| 7,380,625 B2* | 6/2008 | Wang | 180/69.21 |
| 7,506,716 B1* | 3/2009 | Salmon et al. | 180/274 |
| 7,520,363 B2* | 4/2009 | Yamaguchi et al. | 180/274 |
| 7,527,121 B2* | 5/2009 | Kitte et al. | 180/274 |
| 7,637,344 B2* | 12/2009 | Park | 180/274 |
| 7,650,957 B2* | 1/2010 | Takakura et al. | 180/274 |
| 7,730,990 B2* | 6/2010 | Boggess et al. | 180/274 |
| 7,815,007 B2* | 10/2010 | Mori et al. | 180/274 |
| 7,836,996 B2* | 11/2010 | Kitte et al. | 180/271 |
| 7,857,087 B2* | 12/2010 | Matsuura et al. | 180/274 |
| 7,861,818 B2* | 1/2011 | Boggess et al. | 180/274 |
| 7,896,122 B2* | 3/2011 | Borg et al. | 180/274 |
| 7,946,376 B2* | 5/2011 | Hayashi et al. | 180/274 |
| 7,954,588 B2* | 6/2011 | Inomata et al. | 180/274 |
| 7,975,797 B2* | 7/2011 | Yuasa et al. | 180/274 |
| 8,006,997 B2* | 8/2011 | Inoue et al. | 280/728.2 |
| 8,069,943 B2* | 12/2011 | Takahashi | 180/274 |
| 8,141,671 B2* | 3/2012 | Aoki et al. | 180/69.21 |
| 2002/0011371 A1 | 1/2002 | Sasaki et al. | |
| 2005/0179286 A1* | 8/2005 | Adachi | 296/193.11 |
| 2005/0257980 A1 | 11/2005 | Green et al. | |
| 2006/0290172 A1* | 12/2006 | Hirata et al. | 296/187.04 |
| 2007/0074919 A1* | 4/2007 | Hirata | 180/69.2 |
| 2008/0111334 A1* | 5/2008 | Inoue et al. | 280/124.1 |
| 2008/0156556 A1* | 7/2008 | Takahashi | 180/69.21 |
| 2009/0084620 A1* | 4/2009 | Matsuura et al. | 180/69.2 |
| 2009/0127016 A1* | 5/2009 | Hayashi et al. | 180/274 |
| 2009/0145681 A1* | 6/2009 | Hayashi et al. | 180/274 |
| 2009/0223360 A1* | 9/2009 | Aoki et al. | 92/15 |
| 2009/0229901 A1* | 9/2009 | Aoki et al. | 180/69.21 |

FOREIGN PATENT DOCUMENTS

| | | |
|---|---|---|
| JP | 2002-29366 | 1/2002 |
| JP | 2002-29368 | 1/2002 |
| JP | 2002-370611 | 12/2002 |
| JP | 2004-203249 | 7/2004 |
| JP | 2004-308785 | 11/2004 |
| JP | 2005-225392 | 8/2005 |
| JP | 2006-143199 | 6/2006 |
| JP | 2009045978 A * | 3/2009 |
| JP | 2009067303 A * | 4/2009 |
| JP | 2009073276 A * | 4/2009 |
| JP | 2009107496 A * | 5/2009 |
| JP | 2009137507 A * | 6/2009 |

OTHER PUBLICATIONS

"Notice of Reasons for Rejection" in JP 2008-015610; Mailing Date: Jul. 28, 2009.

Response to Written Opinion mailed Mar. 10, 2009 in PCT/JP2009/050976.

International Search Report, mailed Mar. 10, 2009 in PCT/JP2009/050976.

* cited by examiner

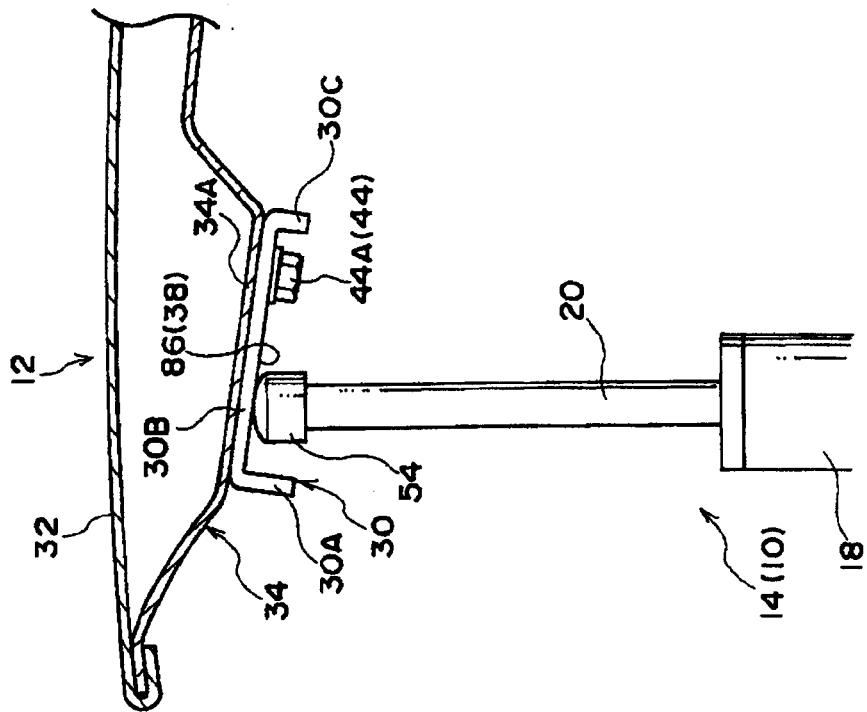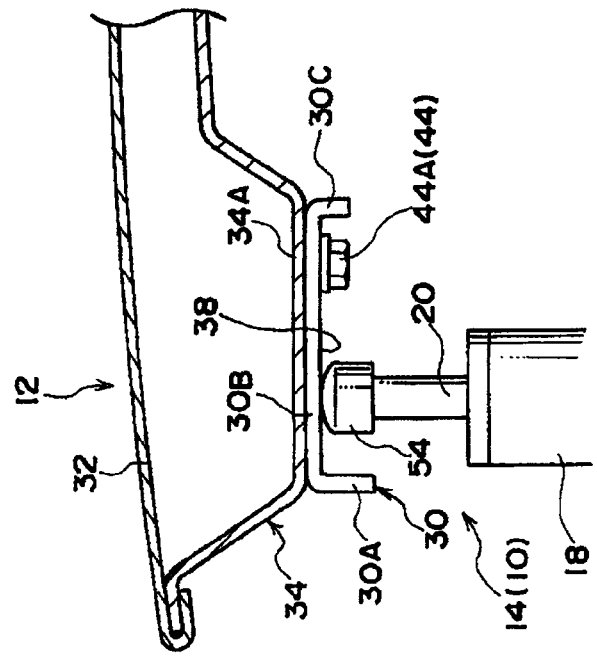

VEHICLE POP UP HOOD APPARATUS

CROSS-REFERENCE TO RELATED APPLICATIONS

This application is a national phase application of International Application No. PCT/JP2009/050976, filed Jan. 22, 2009, and claims the priority of Japanese Application No. 2008-015610, filed Jan. 25, 2008, the contents of both of which are incorporated herein by reference.

TECHNICAL FIELD

The present invention relates to a vehicle pop up hood apparatus.

BACKGROUND ART

Recently, for the safety of pedestrians, a vehicle pop up hood apparatus has been developed in which, when a vehicle collides with a collision body such as a pedestrian, a rear end portion of a hood is raised up and the collision body is received by the hood, and a shock of the collision body is alleviated by the hood. For example, in the vehicle pop up hood apparatus disclosed in cited document 1, a pair of left and right hood hinges are provided at both sides of a rear end portion of a hood, and when a collision occurs with a collision body, actuators provided near the hood hinges operate and a hood side link of each hood hinge is raised upwards by a raising rod.

However, when only the rear end portion of the above hood is raised, if a collision body collides near a position at which the hood is raised, since the raising rod pushes this area, a large reaction load force may act upon the collision body. Therefore, it is desirable for a separate energy absorbing mechanism to be added to the vehicle pop up hood apparatus, so that in cases such as the above a predetermined amount of energy can be absorbed with a predetermined reaction load force or less.

In cited document 2, a technique is disclosed in which an energy absorbing mechanism is added to an actuator that operates a vehicle safety apparatus at a time of collision. In brief, when a load in an axial direction equal to or greater than a predetermined value is input to a distal end portion of a piston rod, a plastically deformable portion provided at the piston rod is crushed, and thereby the piston rod contracts within (moves relative to) a cylinder. Thus, it is conceivable that by using the actuator of cited document 2 with the vehicle pop up hood apparatus of cited document 1, the above needs might be addressed.

Cited document 1: Japanese Patent Application Laid-Open (JP-A) No. 2005-225392
Cited document 2: Japanese Patent Application Laid-Open (JP-A) No. 2004-308785

DESCRIPTION OF THE INVENTION

Problem to be Solved by the Invention

However, in a mechanism that absorbs energy via plastic deformation between the piston rod and the cylinder, variations in the accuracy of dimensions thereof causes variations in the energy absorbing performance (loss occurs). Further, if the direction of operation of a load which is input to a piston rod deviates from the axis of the piston rod, the piston rod does not contract smoothly into the cylinder, and an energy absorbing effect due to plastic deformation may not be sufficiently obtained.

The present invention considers the above facts, and aims to provide a vehicle pop up hood apparatus that can absorb collision energy with high efficiency when a collision load of a predetermined value or greater is input to an area near a hood pushed up position, in a configuration in which a rod is extended and a hood is pushed up by the operation of an actuator at a time of collision with a collision body.

Means for Solving the Problem

The first embodiment is a vehicle pop up hood apparatus, including: an actuator mounted to a vehicle; a rod that extends towards a hood upper side owing to the operation of the actuator, pushes up, towards a hood upper side, a hood rear portion side which is supported so as to be able to open and close with respect to a vehicle body side via a hood hinge, and maintains the hood at the pushed up position, and an energy absorbing mechanism in which, when the hood is in a pushed up state, and a collision load of a predetermined value or greater acts from a hood upper side to near a pushed up region of the hood which is pushed up by the rod, a distal end portion of the rod slides along a pushed up surface of a hood rear portion side towards a vehicle rear side while the rod is made to bend, thereby absorbing collision energy.

The second embodiment is the vehicle pop up hood apparatus according to the first embodiment, in which, when the pushed up state of the hood is seen from a vehicle side, an angle θ, between an axis line of the rod that pushes up a hood rear portion side and a pushed up surface at a hood rear portion side that a distal end portion of the rod contacts, is from 95° to 140°.

The third embodiment is the vehicle pop up hood apparatus of the first or second embodiment, in which the distal end portion of the rod is provided with an inclined surface that inclines at substantially the same angle as an angle of inclination of a pushed up surface of the hood rear portion side when the actuator is not operated.

The fourth embodiment is the vehicle pop up hood apparatus of the first embodiment, further including a reinforcement member that reinforces a contact region at the vehicle rear portion side that a distal end portion of a rod contacts.

The fifth embodiment is the vehicle pop up hood apparatus of the fourth embodiment, in which the reinforcement member is a hinge arm of a hood hinge fixed at one end thereof to a hood rear portion side by a hinge bolt, and the position of the hood rear portion side pushed up by the distal end portion of the rod is offset so as not to overlap with the hinge bolt in a hood width direction.

The sixth embodiment is the vehicle pop up hood apparatus of the fourth embodiment, in which the reinforcement member is a reinforcement plate fixed at a hood rear portion side by a reinforcement plate fixing bolt and configured separately from the hood hinge, and the position of the hood rear portion side pushed up by the distal end portion of the rod is offset so as not to overlap with the reinforcement plate fixing bolt in a hood width direction.

The seventh embodiment is the vehicle pop up hood apparatus of the fifth or sixth embodiment, in which all or part of the pushed up surface of the hinge arm of the fifth embodiment or the reinforcement plate of the sixth embodiment is inclined in advance in a hood width direction such that the distal end portion of the rod may slide in a direction of separation away from the hinge bolt of the fifth embodiment or the reinforcement plate fixing bolt of the sixth embodiment when the distal end portion of the rod slides along the pushed up surface towards a vehicle rear side.

The eighth embodiment is the vehicle pop up hood apparatus of the fifth or sixth embodiment, in which the pushed up surface bends along a predetermined bending line owing to a pushing up force acting thereon when the distal end portion of the rod pushes up the pushed up surface, and owing to the distal end portion of the rod sliding across the bending surface towards a vehicle rear side, the distal end portion of the rod separates away from the hinge bolt of the fifth embodiment or the reinforcement plate bolt of the sixth embodiment.

The ninth embodiment is the vehicle pop up hood apparatus of the eighth embodiment, in which the pushed up surface is the pushed up surface of the hinge arm of the fifth embodiment, and the bending line is not parallel to a rotational axis line of the hinge arm when seen in a vehicle plane view.

The tenth embodiment is the vehicle pop up hood apparatus of the seventh embodiment, in which at the pushed up surface of the hinge arm of the fifth embodiment or the reinforcement plate of the sixth embodiment, at an end portion in a hood width direction at a side opposite a side at which the hinge bolt of the fifth embodiment or the reinforcement plate bolt of the sixth embodiment is provided, is provided a flange that extends in a hood front-rear direction.

The eleventh embodiment is the vehicle pop up hood apparatus of the eighth embodiment, in which at the pushed up surface of the hinge arm of the fifth embodiment or the reinforcement plate of the sixth embodiment, at an end portion in a hood width direction at a side opposite a side at which the hinge bolt of the fifth embodiment or the reinforcement plate bolt of the sixth embodiment is provided, is provided a flange that extends in a hood front-rear direction.

The twelfth embodiment is the vehicle pop up hood apparatus of the eleventh embodiment, in which a low rigidity portion that weakens the flange is provided at an intermediate portion of the flange.

The thirteenth embodiment is the vehicle pop up hood apparatus of the twelfth embodiment, in which at the pushed up surface of the hinge arm of the fifth embodiment or the reinforcement plate of the sixth embodiment, at an end portion in a hood width direction at a side at which the hinge bolt of the fifth embodiment or the reinforcement plate bolt of the sixth embodiment is provided, is provided a second flange that extends in a hood front-rear direction.

The fourteenth embodiment is the vehicle pop up hood apparatus of the twelfth embodiment, in which the low rigidity portion is a cutaway, and a pair of front and rear flanges that sandwich the cutaway are provided such that they are offset in a hood width direction, or such that one of the flanges crosses the other flange.

The fifteenth embodiment is the vehicle pop up hood apparatus of the fifth or sixth embodiment, in which at the pushed up surface of the hinge arm of the fifth embodiment or the reinforcement plate of the sixth embodiment, is provided a guide means that guides a movement of the distal end portion of the rod such that the distal end portion of the rod does not interfere with the hinge bolt of the fifth embodiment or the reinforcement plate bolt of the sixth embodiment when the distal end portion of the rod slides along the pushed up surface towards a vehicle rear side.

The sixteenth embodiment is the vehicle pop up hood apparatus of the fifteenth embodiment, in which the guide means is a guide plate which is separate from the hinge arm of the fifth embodiment or the reinforcement plate of the sixth embodiment, fastened to the hood using the hinge bolt of the fifth embodiment or the reinforcement plate fixing bolt of the sixth embodiment, and has a vertical wall that extends along a hood vertical direction and that separates a movement path of the distal end portion of the rod from the hinge bolt or the reinforcement plate fixing bolt.

The seventeenth embodiment the vehicle pop up hood apparatus of the fifteenth embodiment, in which the guide means is a projecting portion formed integrally with the hinge arm of the fifth embodiment or the reinforcement plate of the sixth embodiment, that projects towards a hood lower direction and separates a movement path of the distal end portion of the rod from the hinge bolt or the reinforcement plate fixing bolt.

The eighteenth embodiment is the vehicle pop up hood apparatus of the fifteenth embodiment, in which the guide means is a resin guide plate fixed to a lower surface of the hinge arm of the fifth embodiment or the reinforcement plate of the sixth embodiment that includes a guide groove along which the distal end portion of the rod can slide.

The nineteenth embodiment is the vehicle pop up hood apparatus of the fifth embodiment or the sixth embodiment, in which at the hinge arm of the fifth embodiment or the reinforcement plate of the sixth embodiment is formed a recessed portion recessed in a bolt fastening direction of the hinge bolt of the fifth embodiment or the reinforcement plate fixing bolt of the sixth embodiment, and in a state after bolt fastening, a pushed up surface of the hinge arm of the fifth embodiment or the reinforcement plate of the sixth embodiment, and an end surface of a bolt head portion accommodated in the recessed portion, are substantially the same surface.

The twentieth embodiment is the vehicle pop up hood apparatus of the fifth embodiment or the sixth embodiment, in which the hinge arm of the fifth embodiment or the reinforcement plate of the sixth embodiment is attached to a hood rear portion side with a hood width direction as a bolt fastening direction.

The twenty-first embodiment is the vehicle pop up hood apparatus of the twentieth embodiment, in which the hinge arm of the fifth embodiment or the reinforcement plate of the sixth embodiment further includes: a horizontal wall arranged substantially in parallel with a lower surface of a hood rear portion side and along which a distal end portion of a rod slides, and a vertical wall which is substantially vertical with respect to a lower surface of a hood rear portion side and which is a bolt fastening portion.

The twenty-second embodiment is the vehicle pop up hood apparatus of the fourth embodiment, in which the reinforcement member is a hinge arm of a hood hinge or a reinforcement plate configured separately from a hood hinge, the hinge arm or the reinforcement plate is fastened to a hood rear portion side by plural hinge bolts or reinforcement plate fixing bolts arranged separated by a predetermined spacing in a hood front-rear direction, and the distal end portion of the rod contacts a region positioned between neighboring bolt fastening points in a hood front-rear direction, and a movement stroke of the distal end portion of the rod between neighboring bolt fastening points in the vehicle front-rear direction is included.

The twenty-third embodiment is the vehicle pop up hood apparatus of the twenty-second embodiment, in which the plural bolt fastening points are arranged in a vehicle front-rear direction along a substantially straight line.

The twenty-fourth embodiment is the vehicle pop up hood apparatus of the fourth embodiment, in which the reinforcement member is a hinge arm of a hood hinge or a reinforcement plate configured separately from a hood hinge; the hinge arm or the reinforcement plate is fastened to a hood rear portion side by plural hinge bolts or reinforcement plate fixing bolts arranged separated by a predetermined spacing in a hood front-rear direction; the distal end portion of the rod contacts a region positioned between neighboring bolt fastening points in a hood front-rear direction, and slides past a rear side bolt fastening point towards a vehicle rear side, and the rear side bolt fastening point is offset in a hood width direction with respect to a front side bolt fastening point.

In the first embodiment, when an actuator mounted to a vehicle operates, a rod extends towards a vehicle upper side, a hood rear portion side is pushed up towards a hood upper side, and held at that position.

In this state of being held up, when a collision load of a predetermined value or greater acts from a hood upper side to near a pushed up region of the hood pushed up by the rod, a predetermined collision energy is absorbed by a energy absorbing mechanism portion. That is, while a distal end portion of the rod slides along a pushed up surface of a hood rear portion side towards a vehicle rear side, the rod bends, and thereby, collision energy is absorbed. In other words, in the present invention, since a configuration is adopted in which a distal end portion of the rod is made to slide along a pushed up surface of a hood rear portion side towards a vehicle rear side, and using this sliding motion, the rod is bent and energy is absorbed, the manner of plastic deformation of the conventional art due to dimensional accuracy is changed, and a loss in energy absorption due to a piston rod not undergoing smooth relative movement to within a cylinder due to the direction of an input load, is greatly reduced.

In the second embodiment, when the state of the hood maintained in a pushed up position is seen from a vehicle side, an angle θ, between an axis line of the rod that pushes up a hood rear portion side and a pushed up surface at a hood rear portion side that a distal end portion of the rod contacts, is set to be from 95° to 140°. As a result, even if the direction of an impact force that acts near a push up position of a hood changes slightly, a distal end portion of a rod slides along a pushed up surface of a rear end side of the hood towards a vehicle rear side. That is, it is possible to bend the rod with high accuracy.

In the third embodiment, the distal end portion of the rod is provided with an inclined surface that inclines at substantially the same angle as an angle of inclination of a pushed up surface of the hood rear portion side when the actuator is not operated. As a result, when the distal end portion of the rod pushes up a pushed up surface of a hood rear side, the distal end portion of the rod makes surface to surface contact with the pushed up surface of the hood rear side. Thereby, a surface pressure that acts between both elements is reduced, and deformation of a pushed up surface of a hood rear portion side can be suppressed or prevented.

In the fourth embodiment, a reinforcement member is provided that reinforces a contact region at a hood rear portion side that a distal end portion of a rod contacts. As a result, even if a distal end portion of a rod contacts a hood rear portion side, the distal end portion of the rod does not directly contact the hood itself.

In the fifth embodiment, the reinforcement member is a hinge arm of a hood hinge fixed at one end thereof to a hood rear portion side by a hinge bolt. As a precondition of this configuration, in the present invention, the position of the hood rear portion side pushed up by the distal end portion of the rod is offset so as not to overlap with the hinge bolt in a hood width direction. As a result, when the distal end portion of the rod slides along the pushed up surface of the hood rear portion side towards a vehicle rear side, the distal end portion of the rod slides towards a vehicle rear side without catching on the hinge bolt. That is, the distal end portion of the rod can slide smoothly towards a vehicle rear side.

In the sixth embodiment, the reinforcement member is a reinforcement plate fixed at a hood rear portion side by a reinforcement plate fixing bolt and configured separately from the hood hinge. As a precondition of this configuration, in the present invention, the position of the hood rear portion side pushed up by the distal end portion of the rod is offset so as not to overlap with the reinforcement plate fixing bolt in a hood width direction. As a result, when the distal end portion of the rod slides along the pushed up surface of the hood rear portion side towards a vehicle rear side, the distal end portion of the rod slides towards a vehicle rear side without catching on the reinforcement plate fixing bolt. That is, the distal end portion of the rod can slide smoothly towards a vehicle rear side.

In the seventh embodiment, all or part of the pushed up surface of the hinge arm or the reinforcement plate is inclined in advance in a hood width direction such that, as a result of the inclination, the distal end portion of the rod slides in a direction of separation away from the hinge bolt or the reinforcement plate fixing bolt when the distal end portion of the rod slides along the pushed up surface towards a vehicle rear side.

In the eighth embodiment, when the distal end portion of the rod contacts and pushes up the pushed up surface of the hinge arm or the reinforcement plate, the pushed up surface of the hinge arm or the reinforcement plate bends along a predetermined bending line owing to a pushing up force acting thereon, and owing to the distal end portion of the rod sliding across the bending surface towards a vehicle rear side, the distal end portion of the rod separates away from the hinge bolt or the reinforcement plate bolt.

In the ninth embodiment, since a bending line not parallel to a rotational axis line of the hinge arm is formed at a pushed up surface of a hinge arm, the strength of the hinge arm can be increased. That is, if the hood is opened or closed excessively, the pushed up surface of the hinge arm attempts to bend taking as a bending line a line parallel to a rotational axis line of the hinge arm. In contrast, in the present invention, since a bending line provided at the pushed up surface of the hinge arm is not parallel to a rotational axis line of the hinge arm in a vehicle plane view, the attempted line of bending (the line parallel to the rotational axis line) and the bending line intersect. As a result, the bending line which is not parallel to the rotational axis line resists the formation of the bending line which is parallel to the rotational axis line, and therefore a pushed up surface of the hinge arm does not readily bend along the bending line which is parallel to the rotational axis.

In the tenth embodiment, at the pushed up surface of a hinge arm or a reinforcement plate, at an end portion in a hood width direction at a side opposite a side at which the hinge bolt or the reinforcement plate bolt is provided, is provided a flange that extends in a hood front-rear direction. As a result, when a distal end portion of the rod slides along a previously formed inclined surface (in the case of claim 7) in a direction of separation away from a hinge bolt or a reinforcement plate fixing bolt, then even if, owing to the inclined surface, the distal end portion of the rod separates too far away from the hinge bolt or the reinforcement plate fixing bolt, the distal end portion of the rod is prevented by the flange from falling away from the inclined surface which is a sliding surface.

In the eleventh embodiment, at the pushed up surface of the hinge arm or the reinforcement plate, at an end portion in a hood width direction at a side opposite a side at which the hinge bolt or the reinforcement plate bolt is provided, is provided a flange that extends in a hood front-rear direction. As a result, when a distal end portion of the rod slides along an inclined surface formed by a bending line of the pushed up surface when the distal end portion of the rod pushes upwards (in the case of the eighth embodiment) in a direction of separation away from a hinge bolt or a reinforcement plate fixing bolt, then even if, owing to the inclined surface, the distal end portion of the rod separates too far away from the hinge bolt or the reinforcement plate fixing bolt, the distal end portion of the rod is prevented by the flange from falling away from the inclined surface which is a sliding surface.

In the twelfth embodiment, when a flange is raised at an end portion in a hood width direction at an opposite side to the hinge bolt or the reinforcement plate fixing bolt at the pushed up surface of the hinge arm or the reinforcement plate, to that extent, the rigidity of the hinge arm or reinforcement plate at the range at which the flange is formed increases. However, in the present invention, since a low rigidity portion is provided at an intermediate portion of the flange, the flange is sure to bend at the low rigidity portion. That is, a predetermined bending line can be formed as desired taking the low rigidity portion as a starting point thereof.

In the thirteenth embodiment, since a second flange is formed at the pushed up surface of the hinge arm or the reinforcement plate, at an end portion in a hood width direction at a side at which the hinge bolt or the reinforcement plate bolt is provided, a decrease in rigidity of the hinge arm or reinforcement plate owing to the low rigidity portion of the flange can be compensated for by the second flange.

In the fourteenth embodiment, since the low rigidity portion is a cutaway, compared to a configuration in which a plate thickness is reduced or the like, manufacture is facilitated. However, when a flange is formed with a cutaway, front and rear flanges that sandwich the cutaway are positioned so as to oppose each other. As a result, when the pushed up surface of the hinge arm or the reinforcement plate bends along the bending line, respective lower end corner portions at cutaway sides of the front and rear flanges may interfere with each other (at an early stage) and obstruct the bending. Thus, in the present invention, a pair of front and rear flanges that sandwich the cutaway are provided such that they are offset in a hood width direction, or such that one of the flanges crosses the other flange. As a result, it is possible to avoid respective lower end corner portions at cutaway sides of the front and rear flanges interfering with each other (at an early stage).

In the fifteenth embodiment, at the pushed up surface of the hinge arm or the reinforcement plate, is provided a guide means that guides a movement of the distal end portion of the rod such that the distal end portion of the rod does not interfere with the hinge bolt or the reinforcement plate bolt when the distal end portion of the rod slides along the pushed up surface towards a vehicle rear side. As a result, the distal end portion of the rod can slide smoothly towards a vehicle rear side.

In the sixteenth embodiment, the guide means is a guide plate which has a vertical wall that extends along a hood vertical direction and that separates a movement path of the distal end portion of the rod from the hinge bolt or the reinforcement plate fixing bolt. As a result, when the distal end portion of the rod slides along the pushed up surface of the hinge arm or the reinforcement plate towards a vehicle rear side, interference with the hinge bolt or reinforcement plate fixing bolt can be prevented by the vertical wall.

Since the above-described guide plate is separate from the hinge arm, the width, length and shape of the locus which the distal end portion of the rod slides along can be set arbitrarily. Therefore, the amount of design freedom increases. Furthermore, since the guide plate is fixed to the hood with a hinge bolt or reinforcement plate fixing bolt, compared to a case in which it is individually and independently fixed to the hinge arm or reinforcement plate, the number of parts can be decreased.

In the seventeenth embodiment, the guide means is a projecting portion formed integrally with the hinge arm or the reinforcement plate, that projects towards a hood lower direction and separates a movement path of the distal end portion of the rod from the hinge bolt or the reinforcement plate fixing bolt. As a result, when the distal end portion of the rod slides along the pushed up surface of the hinge arm or the reinforcement plate towards a vehicle rear side, interference with the hinge bolt or reinforcement plate fixing bolt can be prevented by the projecting portion.

Since the projecting portion is formed integrated with the hinge arm or reinforcement plate, compared to a case in which a guide means is configured separately, the number of parts can be reduced, a weight increase can be suppressed, and an attachment operation becomes unnecessary.

In the eighteenth embodiment, the guide means is a resin guide plate that includes a guide groove along which the distal end portion of the rod can slide. As a result, since the distal end portion of the rod slides towards a vehicle rear side along the guide groove, interference with the hinge bolt or reinforcement plate fixing bolt can be prevented.

Since the above guide plate is separate from the hinge arm or reinforcement plate and fixed to a lower surface of the hinge arm or reinforcement plate, the width, length, depth and shape of the guide groove along which the distal end portion of the rod slides, as well as the weight of the guide plate, can be set arbitrarily. Therefore, design freedom can be increased. Moreover, since the guide plate is made from a resin, there is not a significant increase in weight even if it is provided as a separate part.

In the nineteenth embodiment, at the hinge arm or the reinforcement plate is formed a recessed portion recessed in a bolt fastening direction of the hinge bolt or the reinforcement plate fixing bolt and in a state after bolt fastening, a pushed up surface of the hinge bolt or the reinforcement plate fixing bolt, and an end surface of a bolt head portion accommodated in the recessed portion, are substantially the same surface. As a result, when the distal end portion of the rod slides along the pushed up surface of the hood rear portion side towards a vehicle rear side, the distal end portion of the rod does not catch on a head portion of the hinge bolt or reinforcement plate fixing bolt. Consequently, the distal end portion of the rod can slide smoothly towards a vehicle rear side.

In the twentieth embodiment, the hinge arm or the reinforcement plate is attached to a hood rear portion side with a hood width direction as a bolt fastening direction. As a result, a positional relationship can be obtained in which, when the distal end portion of the rod slides along the pushed up surface of the hood rear portion side towards a vehicle rear side, the distal end portion of the rod does not interfere with the hinge bolt or the reinforcement plate fixing bolt. Consequently, the distal end portion of the rod can slide smoothly towards a vehicle rear side.

In the twenty-first embodiment, since the hinge arm or the reinforcement plate further includes a horizontal wall arranged substantially in parallel with a lower surface of a hood rear portion side, and a vertical wall which is substantially vertical with respect to a lower surface of a hood rear portion side, the horizontal wall can be employed for the sliding of the distal end portion of the rod, and the vertical wall can be employed as an attachment portion for attaching the hinge arm or the reinforcement plate to a hood rear portion side. That is, it is possible to use each wall for a single purpose only. As a result, compared to a case in which the same wall has the functions of a sliding surface of the distal end portion of the rod, and a fastening surface for a bolt, it is possible to simplify the design.

In the twenty-second embodiment, the reinforcement member is a hinge arm of a hood hinge or a reinforcement plate configured separately from a hood hinge, the hinge arm or the reinforcement plate is fastened to a hood rear portion side by plural hinge bolts or reinforcement plate fixing bolts arranged separated by a predetermined spacing in a hood front-rear direction, and the distal end portion of the rod contacts a region positioned between neighboring bolt fastening points in a hood front-rear direction.

Further, the distal end portion of the rod slides from the contact region towards a vehicle rear side, and in the present invention, since a movement stroke of the distal end portion of the rod is included between neighboring bolt fastening points in the vehicle front-rear direction, the hood distal end portion can undergo at least a stroke necessary for bending the rod. As a result, the distal end portion of the rod can slide smoothly towards a vehicle rear side.

In the twenty-third embodiment, the plural bolt fastening points are arranged in a vehicle front-rear direction along a substantially straight line. As a result, it is possible to reduce a dimension in a hood width direction of the hinge arm.

In the twenty-fourth embodiment, the reinforcement member is a hinge arm of a hood hinge or a reinforcement plate configured separately from a hood hinge; the hinge arm or the reinforcement plate is fastened to a hood rear portion side by plural hinge bolts or reinforcement plate fixing bolts arranged separated by a predetermined spacing in a hood front-rear direction, and the distal end portion of the rod contacts a region positioned between a front side bolt fastening points and a rear side bolt fastening point. The distal end portion of the rod slides towards a vehicle rear side from the region, and in the present invention, since the rear side bolt fastening point is offset in a hood width direction with respect to a front side bolt fastening point, the distal end portion of the rod slides past a rear side bolt fastening point without interfering therewith.

Effects of the Invention

As explained above, the pop up hood apparatus according to the first embodiment, has the excellent effect of efficiently absorbing a collision energy when, during a collision with a collision body, an actuator operates, a rod extends, and a hood is pushed up, and a collision load having a predetermined value or greater is input to near a hood pushed up position.

The pop up hood apparatus according to the second embodiment has the excellent effect of suppressing an increase in a reaction force when a rod enters a buckling mode, and increasing reliability of energy absorbing performance.

In the pop up hood apparatus according to the third embodiment, since deformation of a pushed up surface of a hood rear portion side caused by a pushing up force when a distal end portion of a rod pushes up a pushed up surface of a hood rear portion side can be suppressed or prevented, when a collision load acts, the excellent effect of allowing the distal end portion of the rod to slide smoothly along the pushed up surface of the hood rear portion side towards a vehicle rear side can be obtained.

The pop up hood apparatus according to the fourth embodiment has the excellent effect of suppressing or preventing damage to the hood itself by the distal end portion of the rod.

The pop up hood apparatus according to the fifth embodiment has the excellent effect of efficiently absorbing energy at a time of collision, since the distal end portion of the rod can slide smoothly towards a vehicle rear side, and the rod can bend as desired.

The pop up hood apparatus according to the sixth embodiment has the excellent effect of efficiently absorbing energy at a time of collision, since the distal end portion of the rod can slide smoothly towards a vehicle rear side, and the rod can bend as desired.

The pop up hood apparatus according to the seventh embodiment has the excellent effect of more certainly suppressing or preventing the distal end portion of the rod catching on the hinge bolt or the reinforcement plate fixing bolt.

The pop up hood apparatus according to the eighth embodiment has the excellent effect of more certainly suppressing or preventing the distal end portion of the rod catching on the hinge bolt or the reinforcement plate fixing bolt, since it has a simple configuration in which the pushed up surface of the hinge arm or reinforcement plate bends along a predetermined bending line.

The pop up hood apparatus according to the ninth embodiment has the excellent effect of increasing the strength of the hood with respect to excessive opening or the like.

The pop up hood apparatus according to the tenth embodiment has the excellent effect of allowing the distal end portion of the rod to slide until a final or near-final part of a movement stroke set in advance, thereby suppressing a variation in an amount of energy absorbance.

Similar to the invention according to the tenth embodiment, the pop up hood apparatus according to the eleventh embodiment has the excellent effect of allowing the distal end portion of the rod to slide until a final or near-final part of a movement stroke set in advance, thereby suppressing a variation in an amount of energy absorbance.

The pop up hood apparatus according to the twelfth embodiment has the excellent effect of that a bending start point is clarified, and the accuracy of bending the pushed up surface of the hinge arm or reinforcement plate along a predetermined bending line can be increased.

The pop up hood apparatus according to the thirteenth embodiment has the excellent effect of that it is possible to both obtain an accurate formation of the bending line and ensure the rigidity of the hinge arm or reinforcement plate.

The pop up hood apparatus according to the fourteenth embodiment has the excellent effect of that a low rigidity portion can be configured at a low cost, and a pushed up surface of the hinge arm or reinforcement plate can bend smoothly by a required amount.

The pop up hood apparatus according to the fifteenth embodiment has the excellent effect of that, since a distal end portion of the rod can slide smoothly towards a vehicle rear side, a desired bending of the rod can be achieved, and as a result it is possible to efficiently absorb energy at a time of collision.

The pop up hood apparatus according to the sixteenth embodiment has the excellent effect of that the design freedom of a guide means can be increased, and a structure can be simplified.

The pop up hood apparatus according to the seventeenth embodiment has the excellent effect of that a structure can be simplified, weight can be reduced, and attachment operations do not increase.

The pop up hood apparatus according to the eighteenth embodiment has the excellent effect of that the design freedom of a guide means can be increased, and weight can be reduced.

The pop up hood apparatus according to the nineteenth embodiment has the excellent effect of that, since a distal end portion of the rod can slide smoothly towards a vehicle rear side, a desired bending of the rod can be achieved, and as a result it is possible to efficiently absorb energy at a time of collision.

The pop up hood apparatus according to the twentieth embodiment has the excellent effect of that, since a distal end portion of the rod can slide smoothly towards a vehicle rear side, a desired bending of the rod can be achieved, and as a result it is possible to efficiently absorb energy at a time of collision.

The pop up hood apparatus according to the twenty-first embodiment has the excellent effect of that, it is possible to simplify the design of the hinge arm or reinforcement plate, and thereby, owing to the separation of functions, the designs of a horizontal and vertical wall can be optimized.

The pop up hood apparatus according to the twenty-second embodiment has the excellent effect of that, since a distal end portion of the rod can slide smoothly towards a vehicle rear side, a desired bending of the rod can be achieved, and as a result it is possible to efficiently absorb energy at a time of collision.

The pop up hood apparatus according to the twenty-third embodiment has the excellent effect of that, since a hinge arm can be reduced in size in a hood width direction, it is advantageous for vehicles in which a hinge arm cannot be especially wide.

The pop up hood apparatus according to the twenty-fourth embodiment has the excellent effect of that, it is advantageous for vehicles in which, even though a space can be ensured for a front side bolt fastening point, a rear side bolt fastening point cannot be positioned on substantially the same straight line as the front bolt fastening point in a hood front-rear direction, and space can be ensured in a hood width direction.

BRIEF DESCRIPTION OF THE DRAWINGS

FIG. 11A is a vertical section seen from a vehicle front side showing main elements when in a normal state.

FIG. 11B is a vertical section seen from a vehicle front side showing main elements when in a pop up state.

BEST MODE FOR IMPLEMENTING THE INVENTION

First Embodiment

A first embodiment of the vehicle pop up hood apparatus according to the present invention is explained below with reference to FIGS. 1-5. Further, where shown, the arrow FR indicates a vehicle front side, the arrow UP indicates a vehicle upper side, and the arrow IN indicates a vehicle inner side in a width direction.

Figure 1:
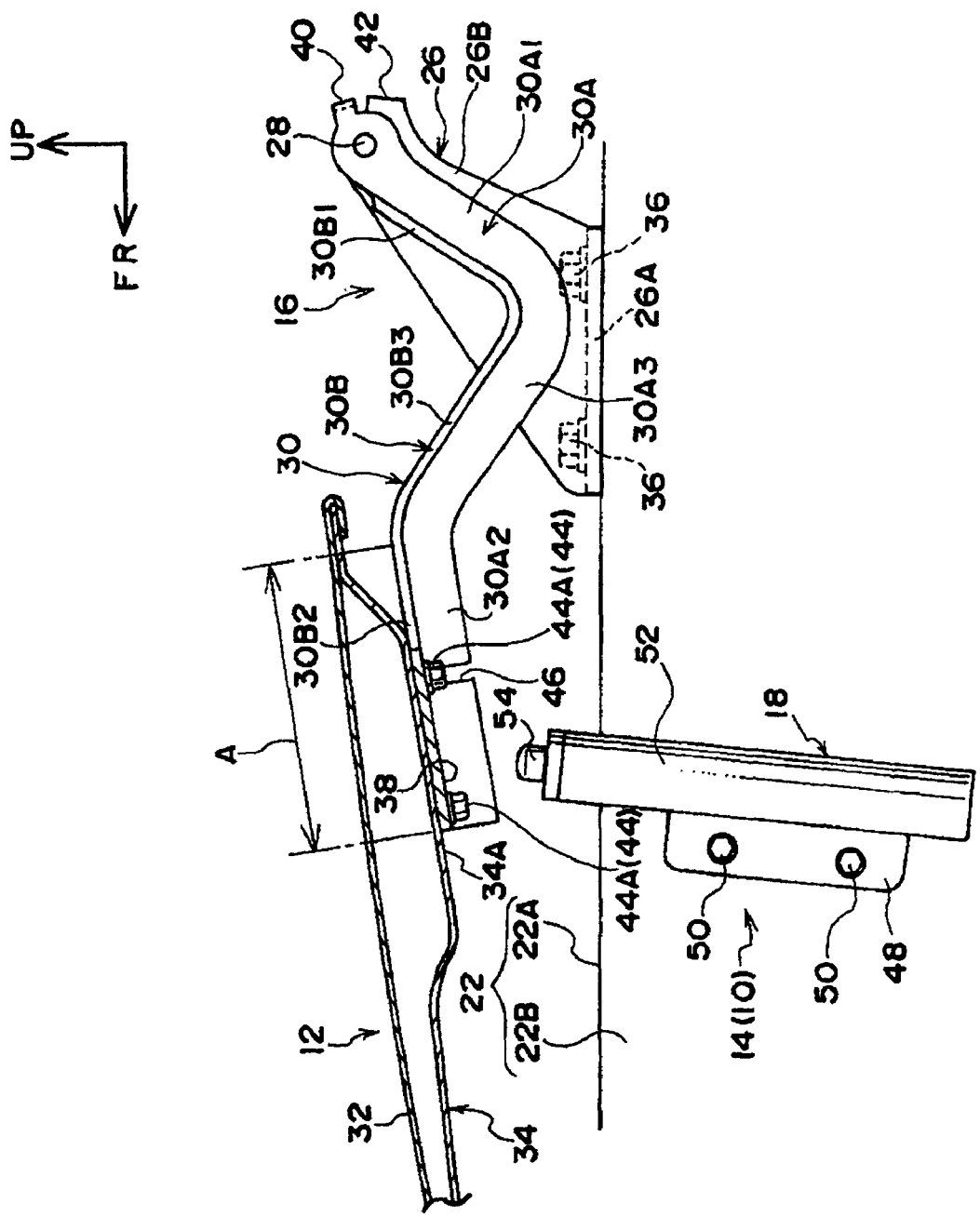
FIG. 1 is a side view showing a pop up mechanism portion provided at a right side as seen from a driver side, in the vehicle pop up hood apparatus according to the first embodiment.
Figure 2:
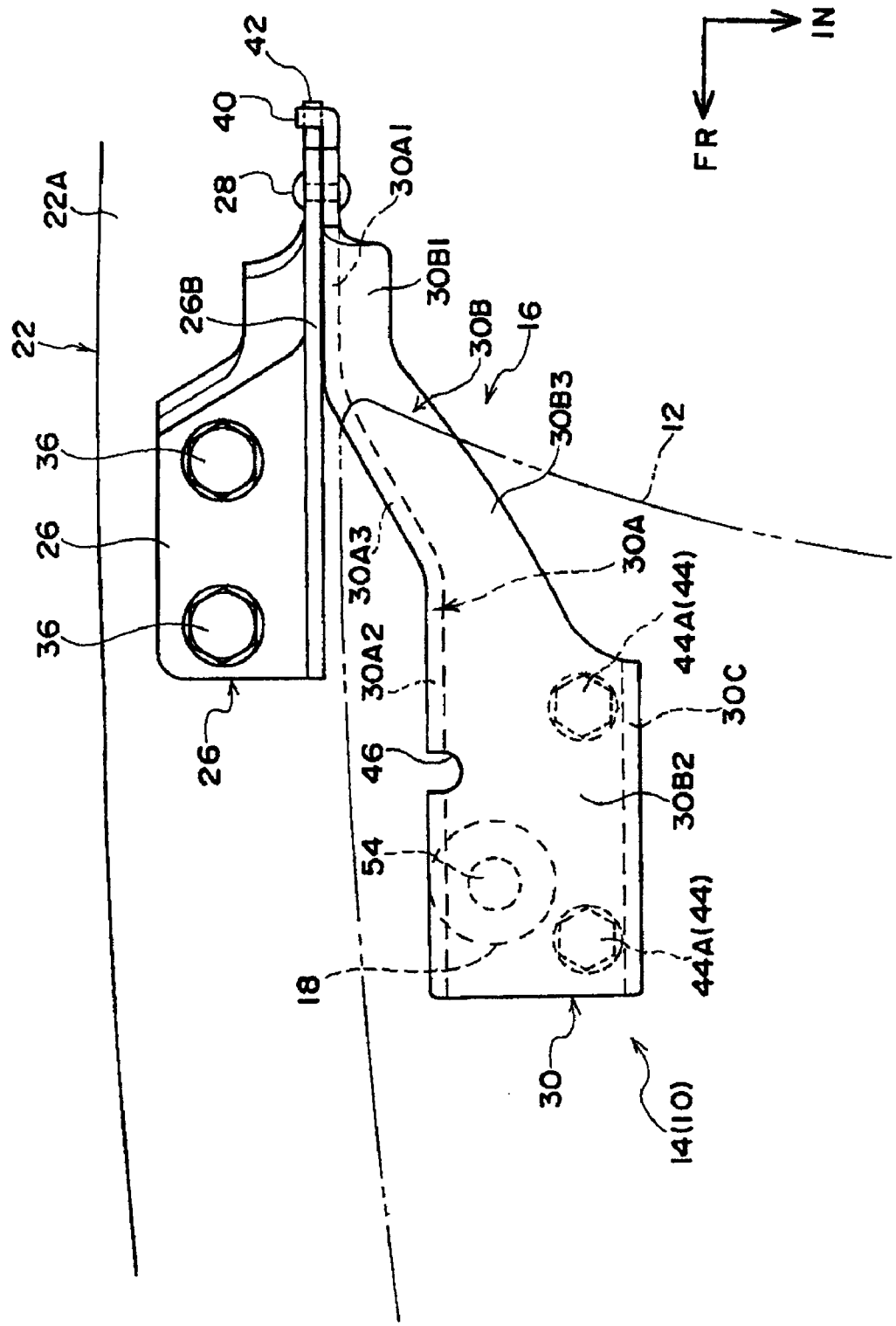
FIG. 2 is an enlarged plane view showing a pop up mechanism portion provided at a right side as seen from a driver side.
Figure 3:
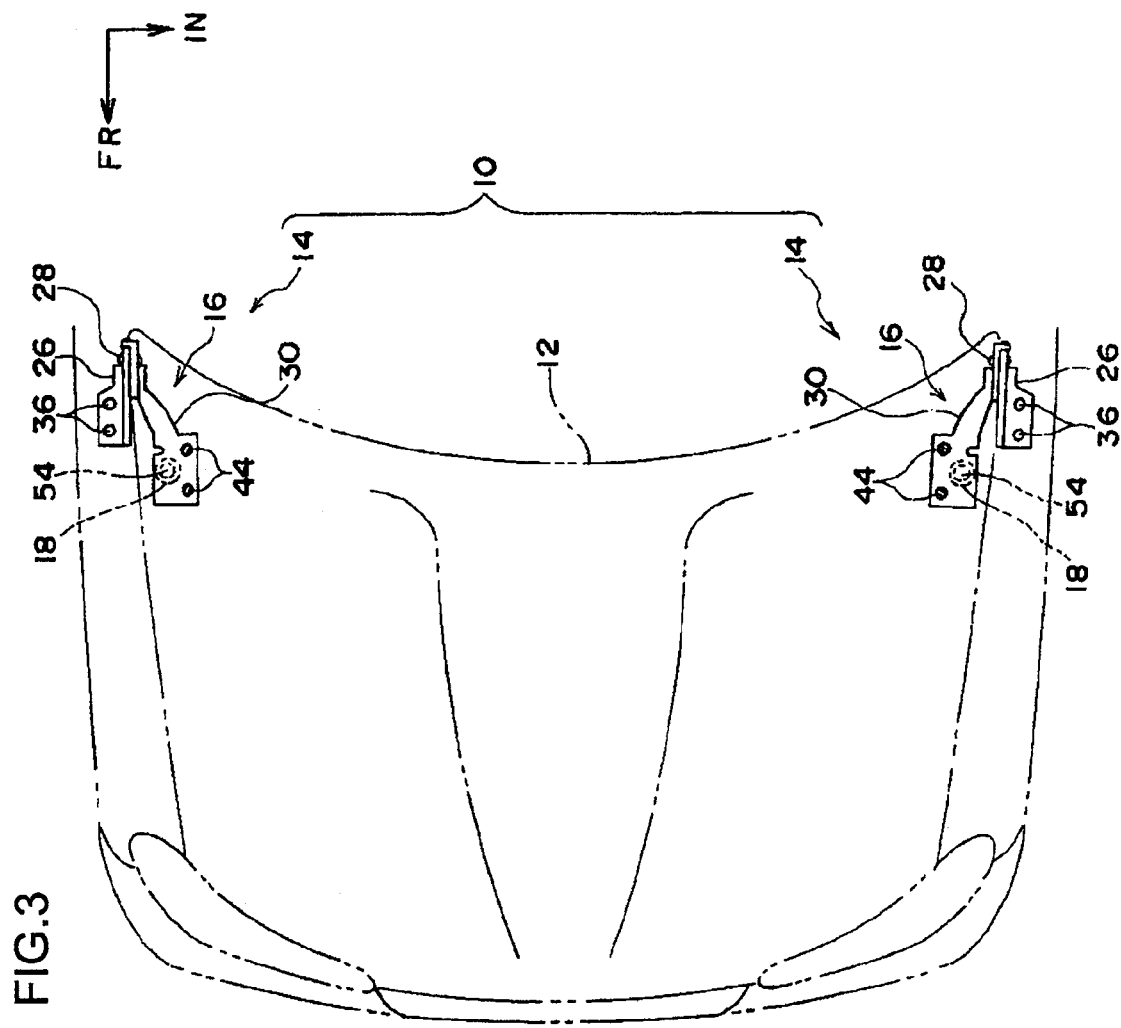
FIG. 3 is a plane view showing an overall configuration of the vehicle pop up hood apparatus of FIG. 1.

FIG. 3 is a plane view showing the overall configuration of the vehicle pop up hood apparatus according to the first embodiment. FIG. 2 is an enlarged plane view showing a pop up mechanism provided at a right side as seen from a driver side of a right-hand-drive vehicle (hereinafter abbreviated as "right side as seen from a driver"). FIG. 1 is an enlarged side view as seen from an engine room side, showing a pop up mechanism portion provided at a right side as seen from a driver side.

As shown in these figures, vehicle pop up hood apparatus 10 is configured to include as main portions a pair of left and right pop up mechanism portions 14, provided respectively at both rear end sides of a hood 12 that opens and closes an engine room. Since left and right pop up mechanism portions 14 have identical configurations, the following only explains the configuration of the pop up mechanism portion 14 provided on the right side as seen from a driver, and explanation of the configuration of the pop up mechanism portion 14 provided on the left side as seen from a driver is omitted.

Pop up mechanism portion 14 includes a hood hinge 16 that supports hood 12 so that it may open and close, an actuator 18 that operates at a time of collision with a collision body such as a pedestrian, and a rod 20 (see FIG. 4) that moves in an axial direction towards a hood upper side due to the operation of actuator 18. These structural elements are explained below in the above order.

Configuration of Hood Hinge 16

Hood hinge 16 includes a hinge base 26 fixed by an attachment bolt 36 (described below) to an upper surface portion 22A of a cowl top side 22, which is a vehicle body side structural member provided at both sides of a cowl that extends along a vehicle width direction between a rear end side of hood 12 and a lower edge portion of a windshield glass, and a hinge arm 30 which connects hinge base 26 and a rear end expanded portion 34A (described below) of hood 12, and which is connected to hinge base 26 so as to be able to rotate relative thereto by a hinge pin 28 (which is a center of a rotational axis).

Hood 12 includes a hood outer panel 32 that configures a design surface arranged at a vehicle outer side, a hood inner panel 34 that is arranged at an engine room side and that reinforces hood outer panel 32, and these two panels are joined at terminal end portions thereof by a hemming process. A rear end side of hood inner panel 34 expands towards a lower end side, thereby forming rear end expanding portion 34A at a rear end side of hood 12. Hood hinge 16 is originally a hinge part for supporting hood 12 such that it can open and close with respect to a body; however, in the present embodiment, it also forms a configurational element of vehicle pop up hood apparatus 10.

Turning to a more specific explanation of the configuration of each portion, as shown in FIGS. 1 and 2, hinge base 26 has a substantially "L" shape as seen from a vehicle front, and includes an attachment portion 26A that extends along a vehicle front-rear direction and has a narrow plate shape, a support portion 26B that bends from an end portion in a vehicle width direction of attachment portion 26A, towards a vehicle upper side, and has a substantially isosceles triangle shape as seen from the side. Attachment portion 26A is fixed to upper surface portion 22A of cowl top side 22 by an attachment bolt 36.

Hinge arm 30 is an elongated member that extends along a vehicle front-rear direction, and that has a substantially "L" shape as seen from the side. Structurally, hinge arm 30 includes a side wall portion 30A, arranged substantially parallel to support portion 26B of hinge base 26, a top wall portion 30B, which is formed to be bent from a top edge portion of side wall portion 30A towards a hood width direction central side, and which is arranged to be substantially parallel to rear end expanding portion 34A of hood 12. Hinge arm 30 has a vertically reversed "L" shape when seen in a vertical section. A front portion lower surface of top wall portion 30B (the region indicated by arrow A in FIG. 1), which is pushed up by a distal end portion (push portion 54) of rod 20 (described below), and along which the distal end portion (push portion 54) slides, is defined as a pushed up surface (sliding surface) 38. In practice, however, rod 20 (described below) moves in an axial direction towards a hood upper side, and a surface which is further to a hood front side than a position at which push portion 54 of the distal end portion contacts (see the position indicated in FIG. 4), is not used as a sliding surface.

Further, an inner side edge of a front end portion of top wall portion 30B bends towards a hood lower side, forming a pair of flanges parallel with side wall portion 30A (this portion is referred to below as "additional side wall portion 30C" (see FIG. 9)). Hinge arm 30 has a substantially "U" shape when seen in a sectional view at a region at which additional side wall portion 30C is formed. Further, additional side wall portion 30C is explained below in the fifth embodiment in relation to a cutaway 46.

As shown in FIG. 2, side wall portion 30A of the above hood hinge 16 includes a rear portion 30A1 provided adjacent to a vehicle width direction inner side of support portion 26B of hinge base 26, a front end portion 30A2, which is provided at a position offset towards a hood width direction center side with respect to rear portion 30A1, and which extends towards a hood front side, and an intermediate portion 30A3, which joins at an angle rear portion 30A1 and front portion 30A2. Top wall portion 30B of hood hinge 16 has a corresponding configuration, and includes a rear portion 30B1 provided at a support portion 26B side of hinge base 26, a front portion 30B2, which is superposed with and contacts a lower surface of rear end expanding portion 34A of hood 12, and intermediate portion 30B3 which joins at an angle rear portion 30B1 and front portion 30B2.

A rear end portion of side wall portion 30A of hinge arm 30 is hinge-connected to an upper end portion of support portion 26B of hinge base 26 by hinge pin 28. As a result, hinge arm 30 is rotatable in a vehicle vertical direction with hinge pin 28 as a rotational axis. At a rear end portion of side wall portion 30A, a stopper 40, which is bent into a hook shape and which is for limiting a degree of opening, projects in a radial direction. In correspondence therewith, a limiter 42 for limiting a degree of opening, which limits the rotation of hinge arm 30 such that it may not rotate beyond the point at which limiter 42 interferes with stopper 40, is integrally provided at an upper end portion of support portion 26B of hinge base 26.

Front portion 30B2 of top wall portion 30B of hinge arm 30 extends in substantially a vehicle front-rear direction along a lower surface of rear end expanding portion 34A of hood 12, and is fastened (fixed) to expanding portion 34A of hood 12 at two points at the front and rear respectively by a hinge bolt 44 and a weld nut (not shown) which are fastening elements. The fastening direction of hinge bolt 44 is a hood vertical direction, and upon attachment thereof, hinge bolt 44 is inserted by screwing hinge bolt 44 into the weld nut (not shown) from a hood lower side. As a result of fastening hinge bolt 44, a bolt head portion 44A of hinge bolt 44 is arranged so as to protrude towards a hood lower side from a lower surface of top wall portion 30B (see FIG. 1).

In addition, at side wall portion 30A, at a position opposing bolt head portion 44A of hinge bolt 44 provided at a hood rear side, is formed a cutaway 46 as a low rigidity portion which has a substantially rectangular shape when seen in a side view. Cutaway 46 is cut away from a lower edge side towards an upper edge side of side wall portion 30A. Cutaway 46 is formed at a ridge line that is a connection region between top wall portion 30B and side wall portion 30A.

In terms of the function of hinge arm 30 having a configuration such as the above, rear portion 30A1 of side wall portion 30A functions as hinge side connection portion, front portion 30B2 of top wall portion 30B functions as a hood side connection portion, and hinge arm 30 can be said to be an element that has both of these functions.

Configuration of Actuator 18

Actuator 18 has a substantially cylindrical shape, and is provided below a front portion of pushed up surface 38 at top wall portion 30B of hinge arm 30 when seen in plane view, and has a substantially vehicle vertical direction as an axial direction. A bracket 48 is provided integrally to actuator 18, bracket 48 being fixed by a bolt 50 to a side surface portion 22B of cowl top side 22. At an inner portion of housing 52 of actuator 18 is a gas generating means configured with a gas generating agent, and a starter device that combusts the gas generating agent and causes it to generate gas. As an alternative to a type that uses a gas generation agent, a type in which high pressure gas is filled into housing 52, and the operation of a starter device breaks a wall which encloses the high pressure gas, may also be used.

The starter device that operates actuator 18 is connected to an ECU (control means; not shown) provided at a lower side or the like of a console box. The ECU is provided at a front bumper or the like, and is connected to a collision detection sensor (collision detection means) that detects or predicts a collision with a collision body such as a pedestrian Configuration of Rod 20

Rod 20 is housed in housing 52 of actuator 18 and has the same axis. Rod 20 is a member having a straight rod shape, and at a lower end portion thereof is provided with a piston (not shown) housed snugly inside housing 52. Gas generated inside housing 52 acts as a driving force with respect to the piston. At an upper end portion of rod 20 is attached push portion 54 which has a larger diameter than rod 20. A distal end of push portion 54 is formed so as to have a gently curving surface, and push portion 54 is provided so as to vertically oppose a position near a front end portion of pushed up surface 38 of top wall portion 30B. Specifically, as shown in FIG. 2, push portion 54 is provided at a hood width direction outer side of pushed up surface 38. In other words, push portion 54, when seen in a vehicle plane view, is provided at a position offset in a hood width direction with respect to the pair of front and rear hinge bolts 44 (at a position where it does not overlap therewith), and is also provided between the pair of front and rear hinge bolts 44 (near the hinge bolt 44 at a hood front side). This positional relationship is employed because vehicle mounting space is limited due to surrounding parts, or the like.

Figure 4:
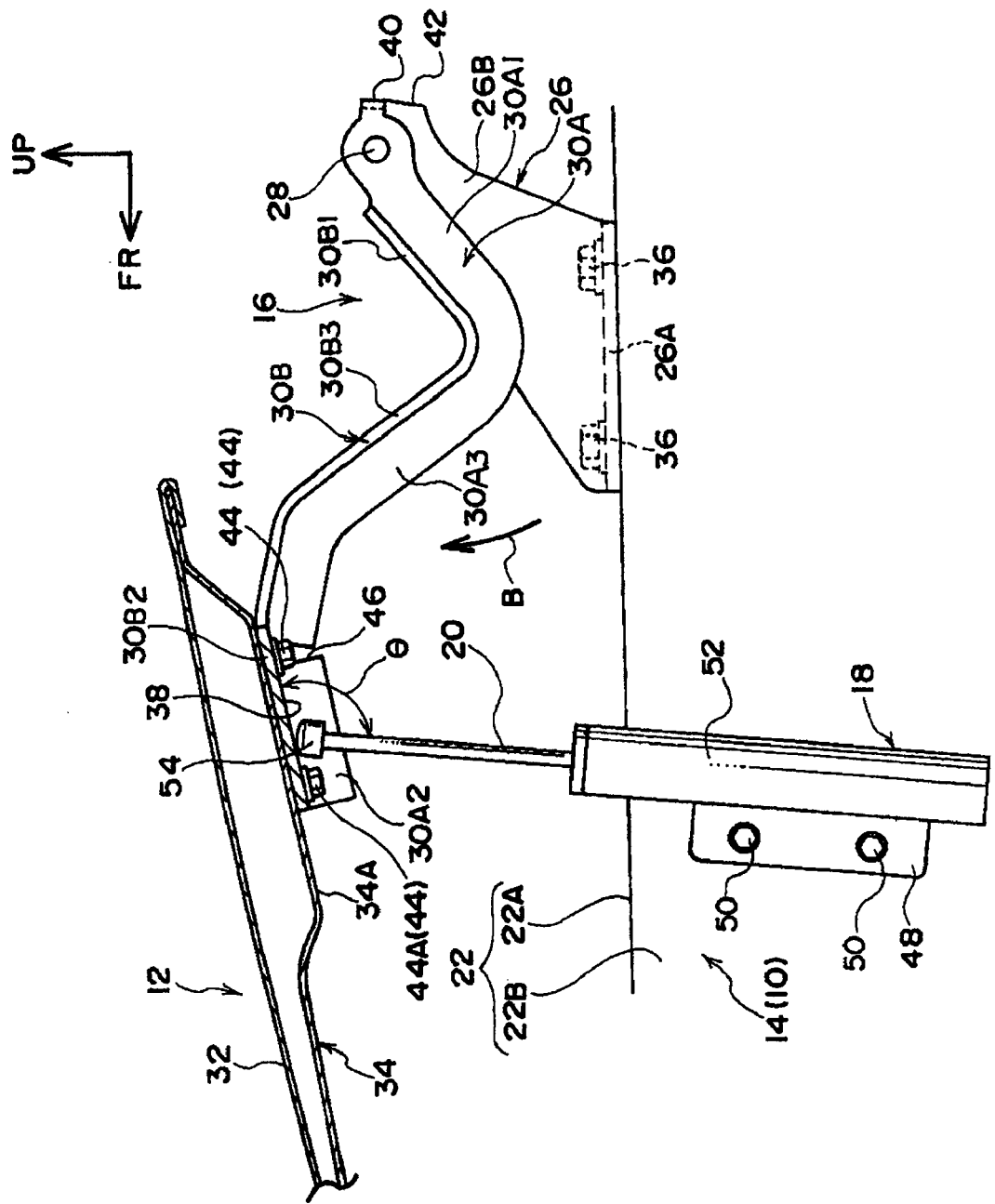
FIG. 4 is a side view corresponding to FIG. 1 showing a state of a pop up hood mechanism portion when maintained in a pushed up position.

Furthermore, when hood 12 is maintained in a pushed up position as shown in FIG. 4, an angle θ between an axis line of rod 20 and pushed up surface 38 of hinge arm 30 is from 95° to 140°. Regarding the "angle θ between an axis line of rod 20 and pushed up surface 38 of hinge arm 30", there are two such angles with respect to the axis line of rod 20; one at a vehicle rear side and one at a vehicle front side. Herein, the "angle θ between an axis line of rod 20 and pushed up surface 38 of hinge arm 30" refers to the former, which is an obtuse angle.

Operation and Effects of the Present Embodiment

Next, the operation and effects of the present embodiment will be explained.

As shown in FIG. 1, when vehicle pop up hood apparatus 10 is not operating, since actuator 18 is not operating, rod 20 is housed in housing 52 of actuator 18. As shown in FIG. 2, push portion 54 of a distal end portion of rod 20 is positioned so as to be directly under a front end side of pushed up surface 38 at top wall portion 30B of hinge arm 30, and at a position offset in a hood width direction with respect to hinge bolt 44 (see FIG. 2).

In this state, in a frontal collision with a collision body such as a pedestrian, the frontal collision is detected by a collision detecting means (not shown) and a collision signal is output to an ECU (not shown). At the ECU, based on the input collision signal, it is determined whether to operate vehicle pop up hood apparatus 10, and if it is determined that vehicle pop up hood apparatus 10 should be operated, an operation signal is output to actuator 18. As a result, an ignition device (not shown) of actuator 18 ignites, and combusts a gas generation agent, and generates a predetermined amount of gas in housing 52. Further, if actuator 18 is a type in which high pressure gas is enclosed, a wall breaks due to the operation of an ignition device, or the like, and a predetermined amount of gas is generated in housing 52 thereby. If a pre-crash sensor is installed, the above operations are performed at a stage at which a frontal collision is predicted.

The gas generated as described above operates on a piston which is housed snugly in housing 52, and pushes the piston towards an axial direction distal end side of housing 52 (that is, towards a hood upper side). Since a lower end portion of rod 20 is connected to the piston, when the piston rises within housing 52, rod 20 moves in an axial direction towards a hood upper side. As a result, as shown in FIG. 4, push portion 54 at a distal end portion of rod 20 contacts pushed up surface 38 of hinge arm 30, and moves hinge arm 30 around hinge pin 28 in a clockwise direction as seen in FIG. 4 (in the direction of arrow B). Thereby, a rear end side of hood 12 (rear end expanding portion 34A) is pushed up in a hood upper direction. At this time, at a front portion 30A2 side of side wall portion 30A of hinge arm 30, the strength of a formed region of cutaway 46 is less than other regions, and therefore hinge arm 30 bends starting from cutaway 46. Since a rotational stroke of hinge arm 30 is limited by stopper 40 formed at a rear end portion of side wall portion 30A contacting with limiter 42 of hinge base 26, hinge arm 30 does not rotate more than a predetermined amount. In other words, the pop up amount (lift up amount) of a rear end side of hood 12 is determined in advance.

Figure 5:
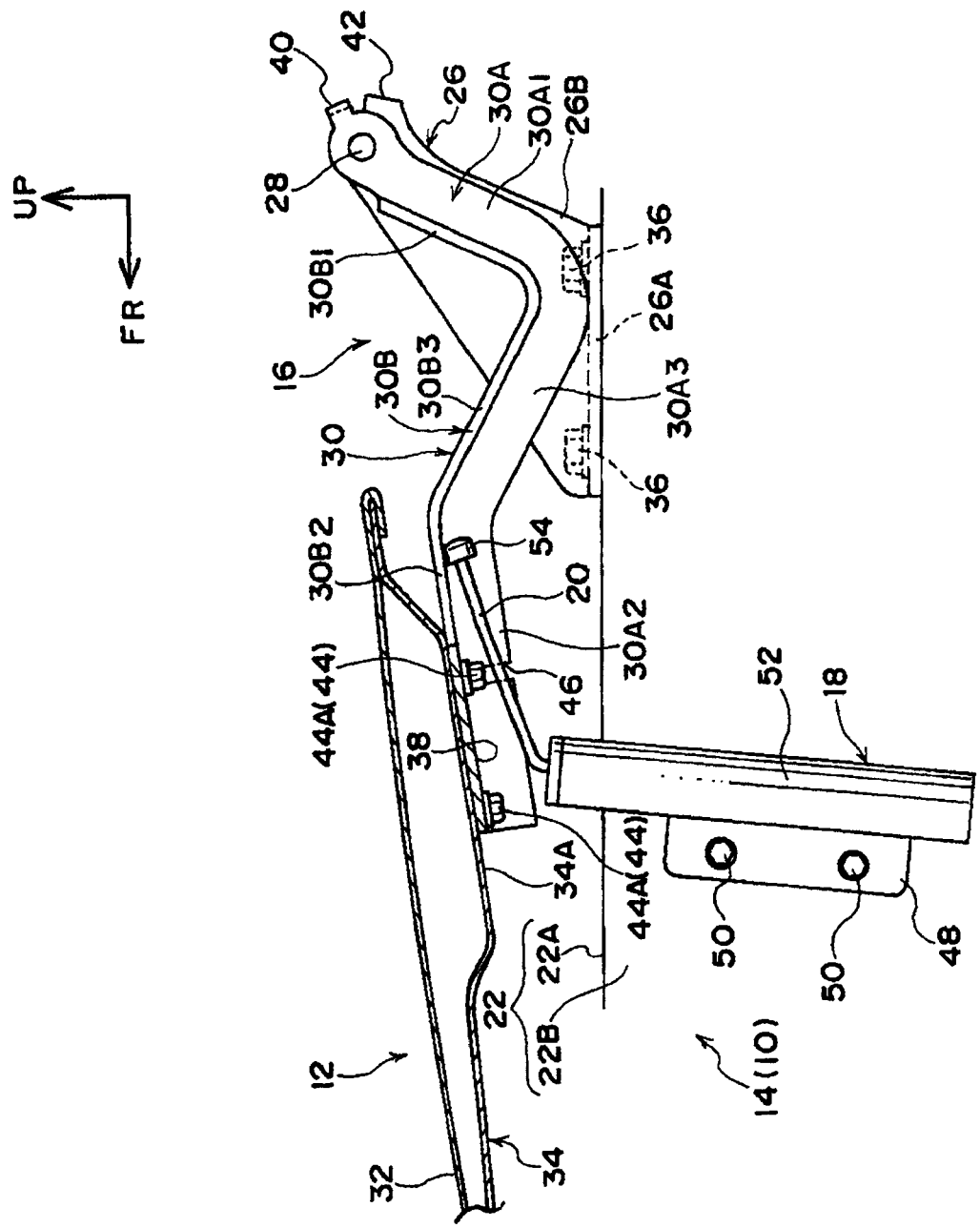
FIG. 5 is a side view corresponding to FIG. 4, showing an operation when a collision load acts from a hood upper side.

When hood 12 is held in the pushed up position shown in FIG. 4, and a collision load above a predetermined value acts from a hood upper side to near a pushed up position of hood 12 effected by rod 20, then as shown in FIG. 5, push portion 54 at a distal end portion of rod 20 slides towards a vehicle rear side along pushed up surface 38 of hinge arm 30. Then, together with the sliding of push portion 54 of rod 20 along pushed up surface 38 of hinge arm 30 towards a vehicle rear side, rod 20 undergoes a bending deformation (a plastic deformation) from the base thereof. Due to the bending deformation of rod 20 at this time, collision energy is absorbed, and a load input to a collision body (reaction force) is reduced. Further, when push portion 54 of rod 20 slides along pushed up surface 38, cutaway 46 of side wall portion 30A of hinge arm 30 is deformed in an opening direction thereof.

That is, in vehicle pop up hood apparatus 10 according to the present embodiment, since a configuration is adopted in which push portion 54 at a distal end portion of rod 20 slides towards a vehicle rear side along pushed up surface 38 of hinge arm 30 which is connected to a rear end side of hood 12, and using this sliding operation, rod 20 is bent from the base thereof and energy is absorbed, it is possible to reduce greatly a loss in energy absorption found in the conventional art and caused by the dimensional accuracy of an energy absorbing mechanism which changes the manner of plastic deformation, or by a piston rod not undergoing smooth relative movement inside a cylinder owing to the input direction of a collision load. As a result, in the present embodiment, in a configuration in which, at a time of collision with a collision body, rod 20 is extended owing to the operation of actuator 18 and a rear end portion of hood 12 is pushed up, it is possible to efficiently absorb collision energy when a collision load of a predetermined value or greater is input near a pushed up position.

In the present embodiment, since, when the state of hood 12 being maintained in a pushed up position is viewed from a vehicle side, an angle θ between an axis line of rod 20 which pushes up a hood rear end side and pushed up surface 38 of a hood rear end side that push portion 54 of a distal end portion of rod 20 contacts is set to be from 95° to 140°, even if the direction of an impact force that acts near a push up position of hood 12 changes slightly, push portion 54 of rod 20 slides along pushed up surface 38 of a rear end side of a hood towards a vehicle rear side. In other words, if the above angle θ was 90°, a collision load would act in an axial direction of rod 20, and as a result rod 20 may buckle. Therefore, θ must be above 90°, and therefore may be set as 95° when also considering a margin of error. Further, if the angle θ exceeds 140°, a friction force between push portion 54 of rod 20 and pushed up surface 38 is reduced by too much, and push portion 54 of rod 20 slips along pushed up surface 38, and rod 20 does not undergo sufficient bending. As a result, angle θ may be 140° or less. If the angle θ is within this range, bending of rod 20 can occur with a high accuracy, a reactive force caused when rod 20 buckles can be suppressed, and it is possible to improve the reliability of an energy absorbing function.

Further, in the present embodiment, at a region at which push portion 54 of rod 20 contacts a hood rear end side, hinge arm 30 is provided as a reinforcing member that reinforces said contact region, and therefore even if push portion 54 of rod 20 contacts a hood rear end side, push portion 54 of rod 20 does not directly contact hood 12 itself. As a result, it is possible to suppress or prevent damage to hood 12 caused by push portion 54 of rod 20.

In addition, in the present embodiment, a pushed up region of a hood rear end side which is pushed up by push portion 54 of a distal end portion of rod 20 is provided at an offset position such that it does not overlap in a hood width direction with respect to bolt head portion 44A of hinge bolt 44. As a result, when push portion 54 of rod 20 slides along pushed up surface 38 of hinge arm 30 towards a vehicle rear side, push portion 54 of rod 20 slides towards a vehicle rear side without catching on bolt head portion 44A of hinge bolt 44. That is, in the present embodiment, since an interference avoidance mechanism or an interference avoidance means with respect to bolt head portion 44A of hinge bolt 44 has been added at hinge arm 30, the sliding of push portion 54 of rod 20 towards a vehicle rear side can occur smoothly. As a result, rod 20 can be bent as desired, and thereby energy can be efficiently absorbed at a time of collision.

To further explain this point, if, when a collision load acts upon a hood (the initial stage thereof), a distal end portion of a rod catches on a fastener such as a hinge bolt (even if the angle θ between an axial line of rod 20 and pushed up surface 38 is within the abovementioned range), both side portions in an axial direction of the rod become constrained (a lower end portion of the rod is constrained by an actuator, and an upper end portion of the rod is constrained by a head portion of the fastener), the distal end portion of the rod cannot slide towards a vehicle rear side along the hinge arm, and the rod bends at a center portion in an axial direction thereof, this state being referred to as "a buckling mode". In this case, an input load (reactive force) with respect to a collision body increases, and a desired energy absorbing function cannot be obtained. By contrast, in the present embodiment, a pushed up position of a hood rear end side pushed up by push portion 54 of a distal end portion of rod 20 is offset in a hood width direction with respect to bolt head portion 44A of hinge bolt 44, and thereby the above described event does not occur, and thus the present embodiment is advantageous.

Second Embodiment

A second embodiment of the vehicle pop up hood apparatus according to the present invention is explained below with reference to FIG. 6. Further, configurational elements identical to those of the first embodiment have the same reference numerals thereas, and description thereof is omitted (the same applies to the third embodiment and subsequent embodiments).

Figure 6:
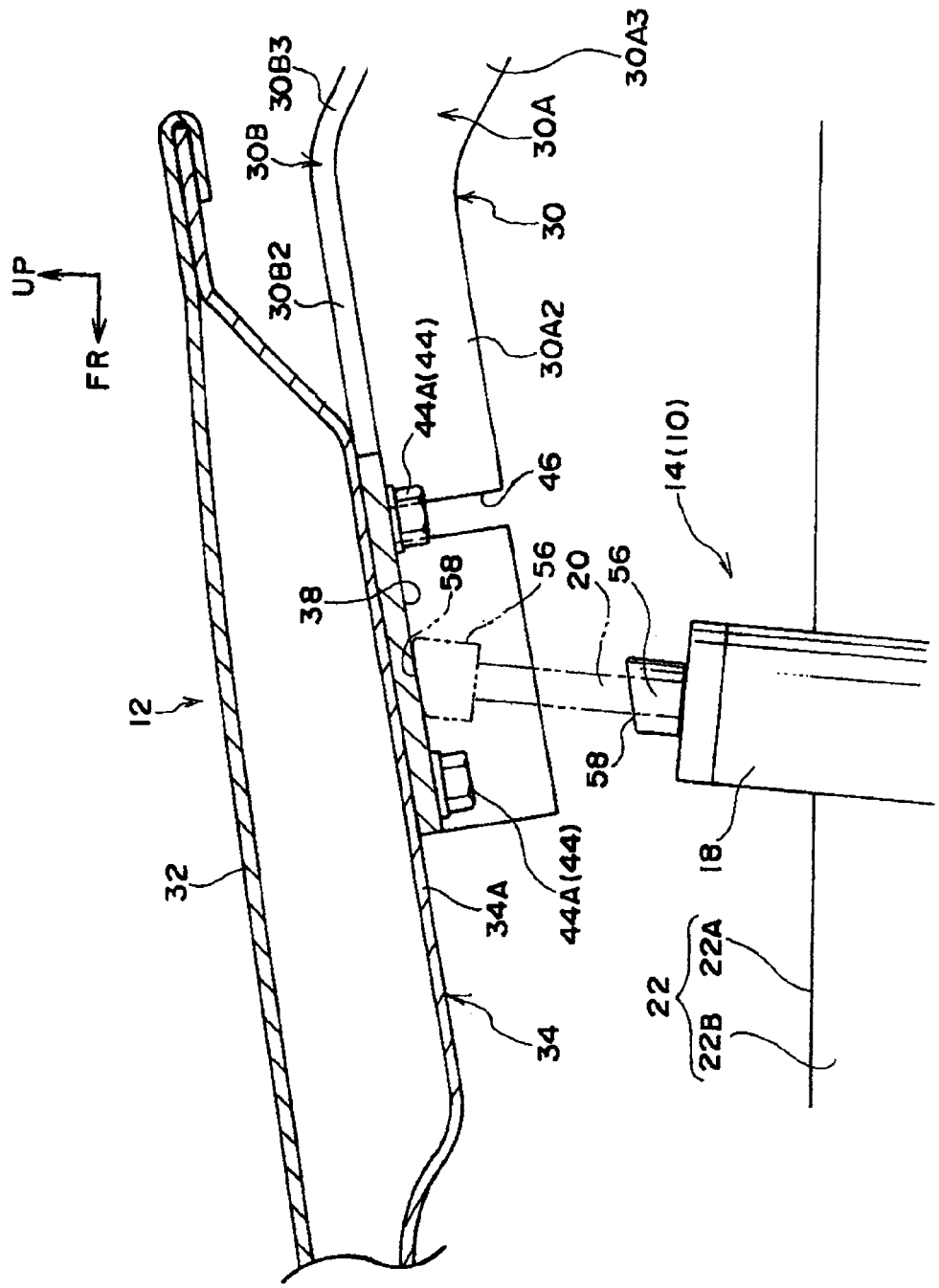
FIG. 6 is an enlarged side view showing the main elements of a vehicle pop up hood apparatus according to the second embodiment.

As shown in FIG. 6, in the second embodiment, an end portion of push portion 56 provided at a distal end portion of rod 20 is characterized in that it is configured by an inclined surface 58 that matches an inclination angle of pushed up surface 38 when pushed up surface 38 of hinge arm 30 is pushed up. More specifically, inclined surface 58, which matches an inclination angle of pushed up surface 38 at a normal time (when vehicle pop up hood apparatus 10 is not operated), is formed at an end surface of push portion 56.

Operation and Effects

Owing to the above configuration, when actuator 18 operates, rod 20 moves in an axial direction towards a hood upper side, and push portion 54 of a distal end portion of rod 20 pushes up pushed up surface 38 of hinge arm 30, inclined surface 58 of push portion 56 contacts pushed up surface 38 in a surface-to-surface manner. Thereby, compared to a case in which a push portion of rod 20 contacts pushed up surface 38 in a point-contact manner, a surface pressure with respect to a contact surface is low, and to that extent, it is less likely that pushed up surface 38 (hinge arm 30) will deform. Since there is little deformation of pushed up surface 38, when a collision load acts, a distal end portion (push portion 56) of rod 20 can slide smoothly along pushed up surface 38 of hinge arm 30 towards a vehicle rear side.

To explain further, when hood 12 is popped up, a distal end portion of rod 20 strongly pushes pushed up surface 38 of hinge arm 30 since the rotation of hinge arm 30 is limited by stopper 40, but a force stronger than the pushing force at this time acts upon pushed up surface 38 when actuator 18 operates and a distal end portion of rod 20 begins to push up hinge arm 30 (when it first contacts thereat). Therefore, it is most effective to configure inclined surface 58 at a distal end portion of rod 20 such that it is in a state of surface to surface contact at this time.

Third Embodiment

A third embodiment of the vehicle pop up hood apparatus according to the present invention is explained below with reference to FIG. 7.

Figure 7:
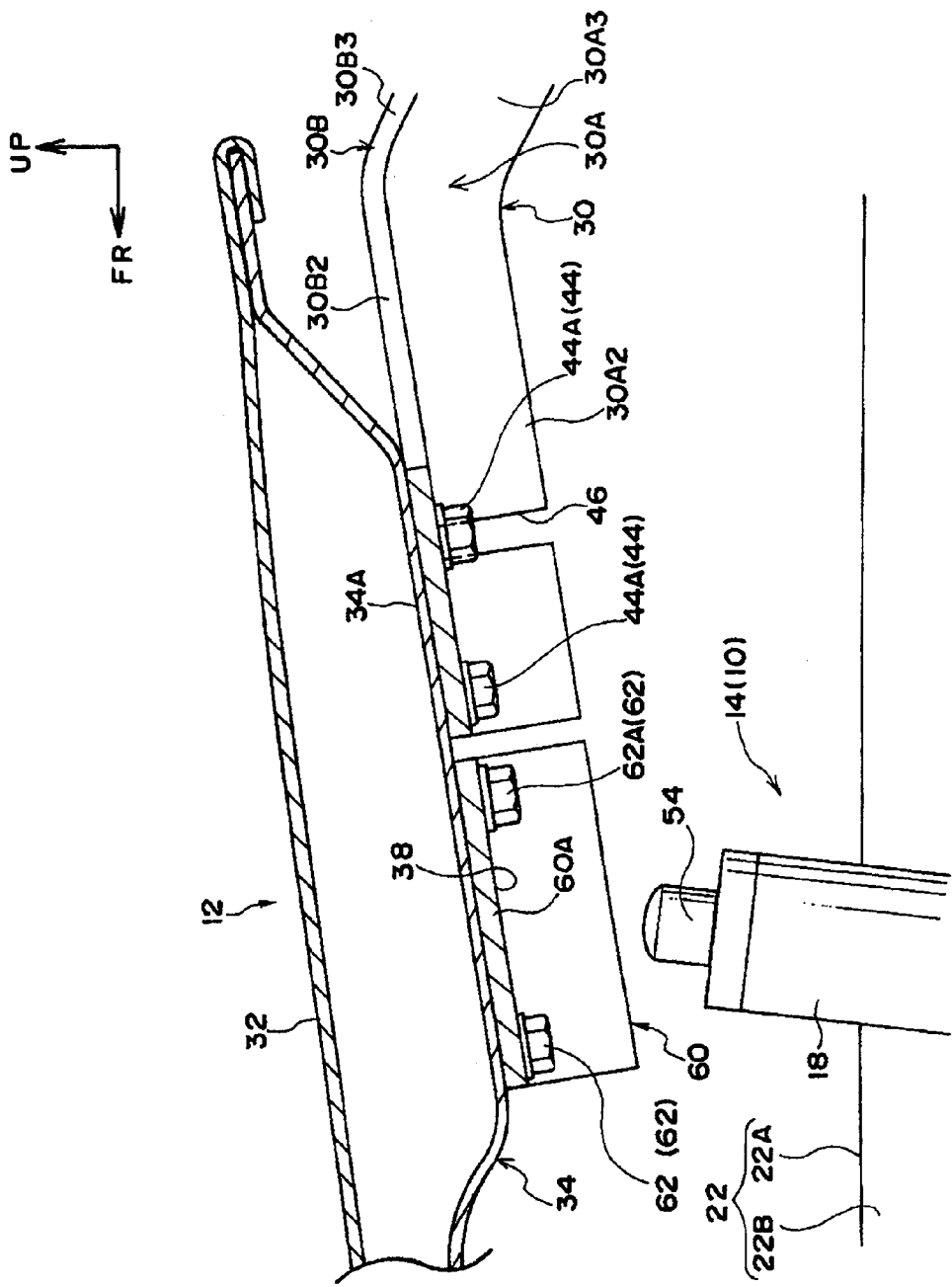
FIG. 7 is an enlarged side view showing the main elements of a vehicle pop up hood apparatus according to the third embodiment.

As shown in FIG. 7, in the third embodiment, a reinforcement plate 60 as a reinforcement member separate from hinge arm 30 of hood hinge 16, is provided at a front side of hinge arm 30. Reinforcement plate 60 has a "U" shape in a cross section, similar to a front portion of hinge arm 30, and is fixed to rear end expanded portion 34A of hood 12 by two reinforcement plate fixing bolts 62 at a front and rear respectively.

Actuator 18 and rod 20 are provided at a lower side of reinforcement plate 60 vertically opposite thereto. As a result, actuator 18 and rod 20 are in a layout where they do not oppose hinge arm 30. Further, push portion 54 of a distal end portion of rod 20 is provided at a position offset in a hood width direction with respect to reinforcement plate fixing bolts 62, when seen in plane view.

Operation and Effects

According to the above configuration, when actuator 18 operates, rod 20 moves in an axial direction towards a hood upper side, and push portion 54 contacts with pushed up surface 38 of a top wall portion 60A of reinforcement plate 60. A pushed up position of reinforcement plate 60 when pushed by push portion 54 is offset such that it does not overlap with reinforcement plate fixing bolts 62 in a hood width direction. Thereby, when push portion 54 slides along pushed up surface 38 of reinforcement plate 60 towards a vehicle rear side, push portion 54 slides towards a vehicle rear side without catching on a bolt head portion 62A of reinforcement plate fixing bolts 62. That is, the sliding of push portion 54 of a distal end portion of rod 20 towards a vehicle rear side can occur smoothly. Thus, in the present embodiment, a desired bending of rod 20 can be obtained, and as a result it is possible to efficiently absorb collision energy.

Since the present embodiment has a configuration in which reinforcement plate 60 is provided separately from hinge arm 30, and push portion 54 of rod 20 slides along pushed up surface 38 of reinforcement plate 60, it is advantageous for vehicle types (vehicle body structures) which must employ this manner of layout of parts.

In the configuration shown in FIG. 7, reinforcement plate 60 is provided such that a predetermined gap is opened at a hood front side of hinge arm 30, and pushed up surface 38 is only provided at reinforcement plate 60. However, the invention is not limited to this, and pushed up surface 38 may be provided such that it contacts (connects) both reinforcement plate 60 and hinge arm 30 in a hood front-rear direction, such that it spans these two members.

Fourth Embodiment

A fourth embodiment of the vehicle pop up hood apparatus according to the present invention is explained below with reference to FIG. 8.

Figure 8:
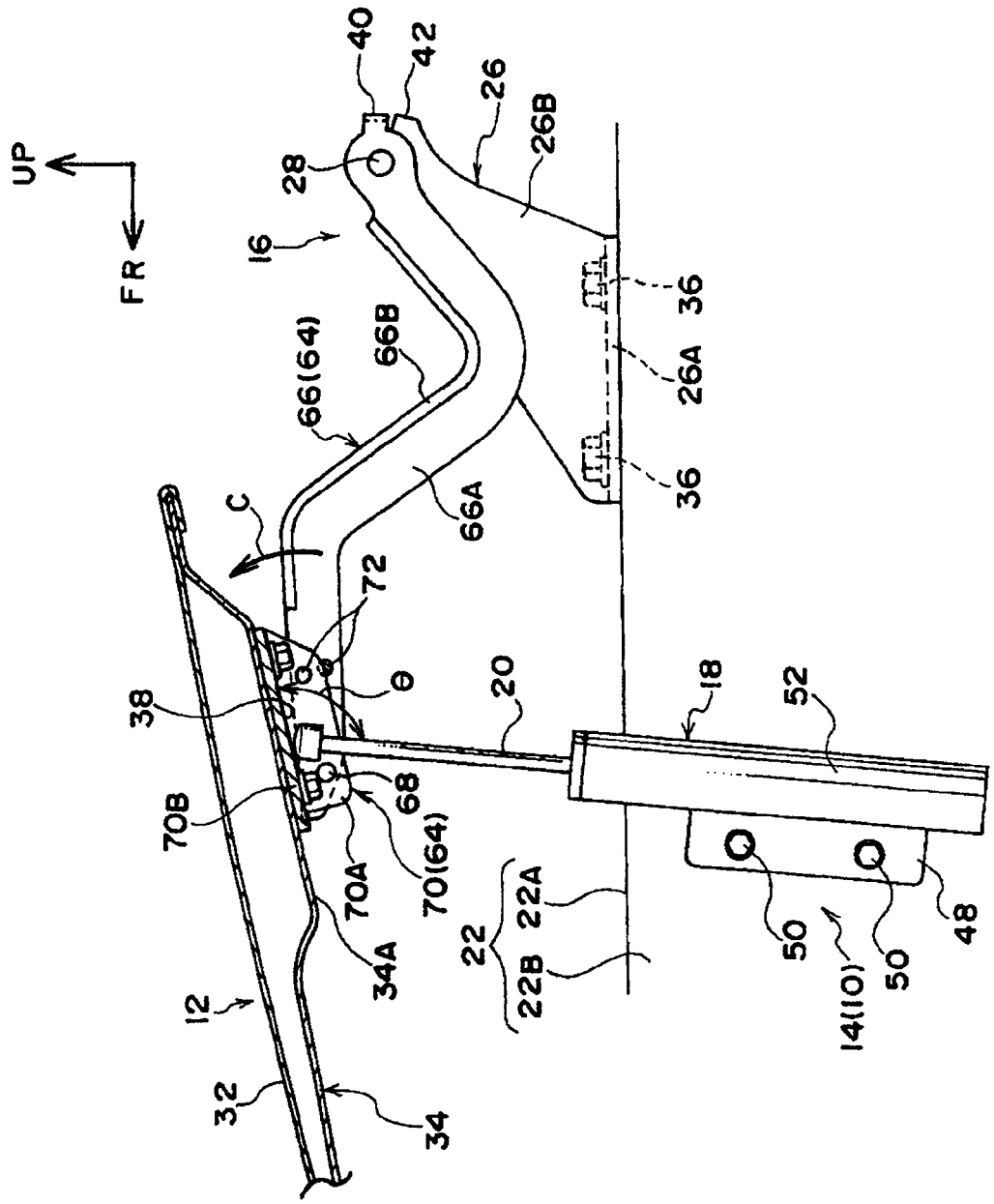
FIG. 8 is a side view showing the main elements of a vehicle pop up hood apparatus according to the fourth embodiment.

As shown in FIG. 8, the present embodiment is characterized in that it is an application of the present invention to a hinge arm 64 with a two-part structure. That is, hinge arm 64 includes a lower hinge arm 66 which has substantially the same shape when seen from the side as hinge arm 30 described in the first embodiment, and an upper hinge arm 70 which is connected to a front end portion of lower hinge arm 66 by a hinge pin 68 such that it may rotate relative thereto, and which has a straight line shape in plane view. Lower hinge arm 66 is similar to hinge arm 30 of the first embodiment in that it is provided with a side wall portion 66A at an outer side in a hood width direction and a top wall portion 66B and it has an "L" shape in cross section. However, in order to avoid interference with upper hinge arm 70, it is not provided a front end portion of top wall portion 66B or an additional side wall portion at an inner side in a hood width direction. Moreover, upper arm 70 has a substantially "U" shape in cross section when seen from a vehicle front. Normally, a side wall portion 70A of upper hinge arm 70 is connected to a shear pin 72 at a position such that it overlaps with side wall portion 66A of lower hinge arm 66. Shear pin 72 is configured to break owing to a shearing load of a predetermined value or greater.

In the above structure, an angle θ between rod 20 and pushed up surface 38 of hood 12 when maintained in a pushed up position is from 95° to 140°, similar to the first embodiment.

Operation and Effects

The operation of the above configuration and the effects obtained thereby are similar to those of the first embodiment. That is, when actuator 18 operates and rod 20 moves in an axial direction towards a hood upper side, push portion 54 of a distal end portion of rod 20 contacts a lower surface (pushed up surface 38) of head wall portion 70B of upper hinge arm 70, and pushes up the same. Subsequently, when a shearing load that acts upon shear pin 72 reaches a predetermined shearing value, shear pin 72 breaks and upper hinge arm 70 undergoes relative rotation around hinge pin 68 in the direction of arrow C in FIG. 8. As a result, hood 12 is maintained in a pushed up position. Thereafter, when a collision load acts from a hood upper side, push portion 54 slides along pushed up surface 38 of upper hinge arm 70 towards a vehicle rear side, and rod 20 bends from a base thereof, and thus similar effects to those of the first embodiment can be obtained.

Fifth Embodiment

A fifth embodiment of the vehicle pop up hood apparatus according to the present invention is explained below with reference to FIGS. 9-13.

The fifth embodiment is characterized in that a hinge arm surface (pushed up surface 38) of hinge arm 30 is inclined, thus avoiding interference between push portion 54 of a distal end portion of rod 20 and bolt head portion 44A of hinge bolt 44.

Figure 9:
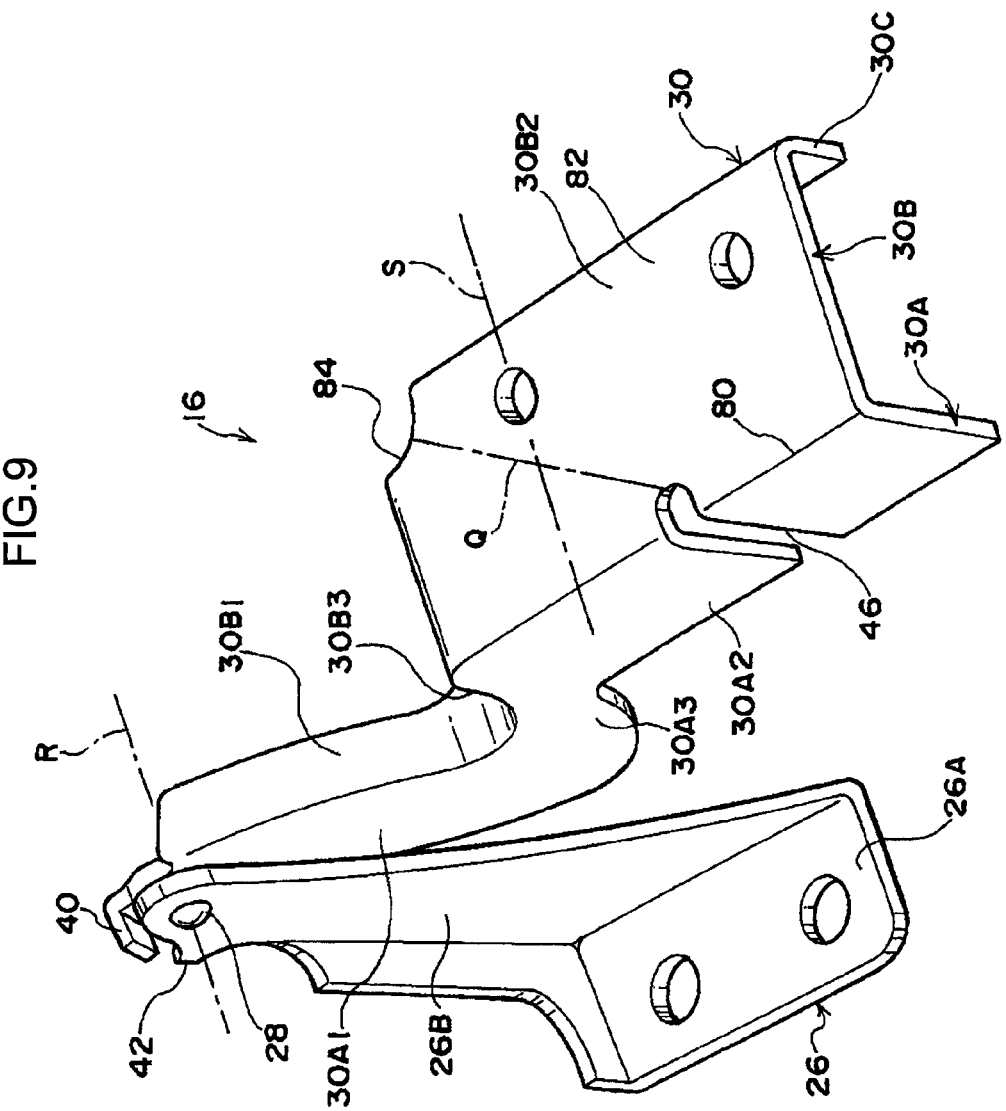
FIG. 9 is an enlarged perspective view showing a hood hinge of a vehicle pop up hood apparatus according to the fifth embodiment.
Figure 10:
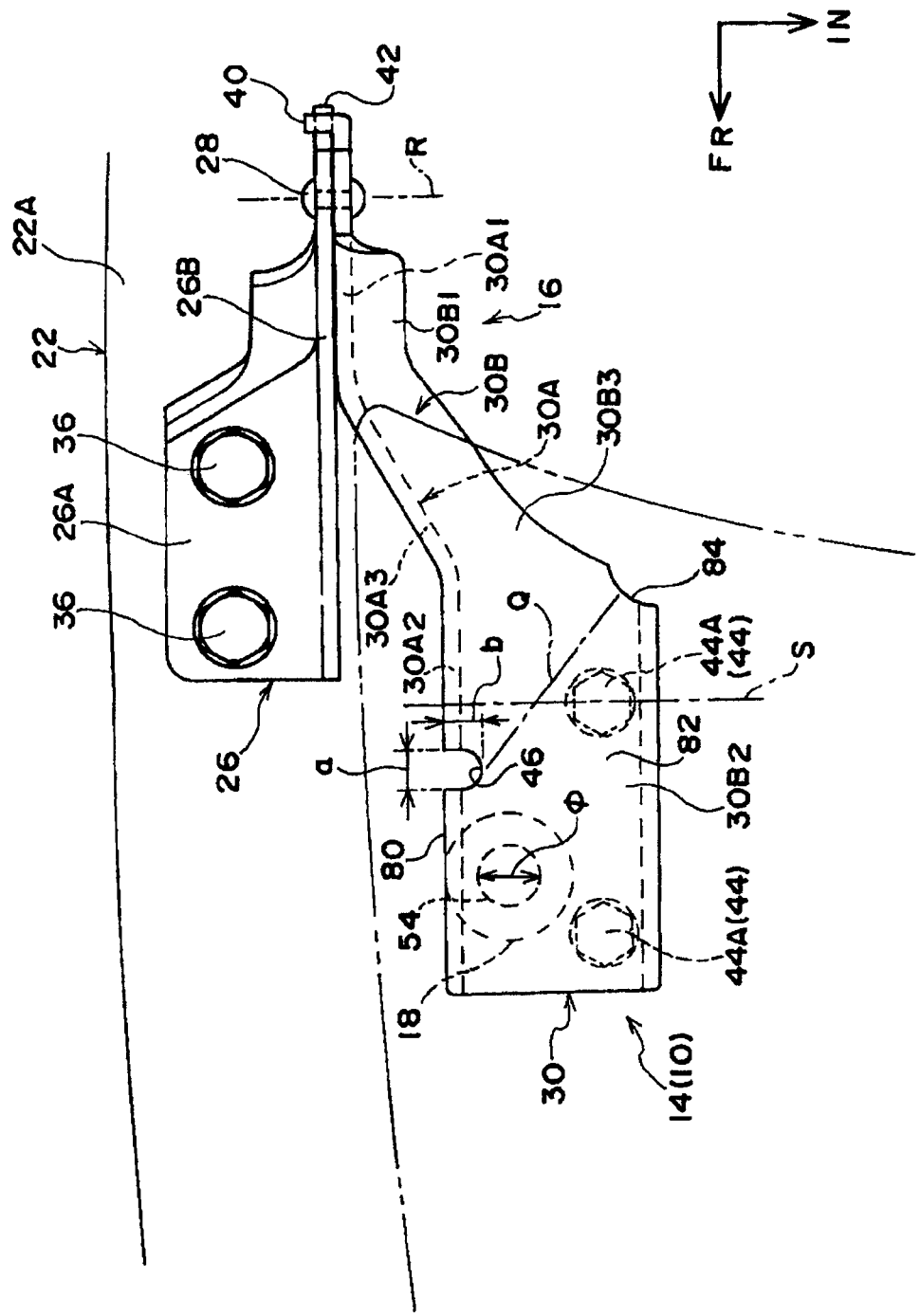
FIG. 10 is an enlarged plane view showing the positional relationships between a pushing portion of a rod, a hinge bolt, a cutaway and a bending line, when the hood hinge shown in FIG. 9 is attached.

Specifically, in the examples shown in FIGS. 9-11, the overall shape and structure of hinge arm 30 is similar to that of the first embodiment described above, and a front portion thereof includes a side wall portion 30A, a top wall portion 30B and an additional side wall portion 30C, formed in a "U" shape.

At a predetermined position in a length direction of side wall portion 30A at an outer side in a hood width direction of hinge arm 30 (slightly further to a hood rear side than a push up position pushed up by push portion 54 of rod 20), is formed a cutaway 46 as a low rigidity portion. Cutaway 46 is similar to that described in the first embodiment; in order to reduce the rigidity of side wall portion 30A, side wall portion 30A is cut away vertically from a lower edge side thereof, and divided into front and rear, and the cutaway extends to the plate thickness of top wall portion 30B, thereby cutting across a ridge line 80 between side wall portion 30A and top wall portion 30B. In terms of dimensions, as shown in FIG. 10, a cutaway width a and a cutaway length b of cutaway 46 in plane view are smaller than an outer diameter φ of push portion 54. Cutaway width a requires around two times the plate width of hinge arm 30, but if cutaway width a is too large, when push portion 54 slides towards a vehicle rear side, it may become stuck in cutaway 46, and therefore it is preferable that cutaway 46 is two times the size of the plate thickness or greater, but less than the outer diameter of push portion 54.

The shape of cutaway 46 is not particularly limited, and may be a slit, a vertically inverted "V" shape, or a "U" shape. In the above configuration, cutaway 46 is provided as a low rigidity portion, but the present invention is not limited thereto, and the low rigidity portion may be a bead or notch or the like.

Additional side wall portion 30C at the opposite side is formed over a range that includes, in a hood front-rear direction, two fastening positions of a pair of front and rear hinge bolts 44. A corner portion of a rear end inner side of a fixing surface 82 fixed to hood 12 of top wall portion 30B has a quarter-circle cut therefrom, and additional side wall portion 30C is formed until this cutaway portion 84. That is, at cutaway portion 84, where additional side wall portion 30C does not exist, rigidity suddenly changes and a further low rigidity portion is formed. Further, a bending line Q joins cutaway 46 and cutaway portion 84.

Operation and Effects

According to the above configuration, the state shown in FIG. 11A is a normal state, and therein pushed up surface 38 of hinge arm 30 is not inclined. To move from this state to that shown in FIG. 11B, actuator 18 operates, push portion 54 of a distal end portion of rod 20 pushes pushed up surface 38 of hinge arm 30 to a pushed up position (the position of push portion 54 in FIG. 10), whereby owing to the pushing up force at this time, top wall portion 30B inclines towards a pushed up side (an outer side in a hood width direction of top wall portion 30B). In other words, top wall portion 30B bends at bending line Q, and thereby an inclined surface 86 is formed. As a result, when push portion 54 of a distal end portion of rod 20 slides along inclined surface 86 of pushed up surface 38 towards a vehicle rear side, it slides in a direction of separation from hinge bolt 44.

Thus, in the present embodiment, a comparatively simple configuration is employed in which cutaway 46 and cutaway portion 84 are provided such that when push portion 54 of rod 20 pushes top wall portion 30B, bending line Q is formed thereat, and thereby a behavior (movement locus) of push portion 54 of a distal end portion of rod 20 can be controlled. As a result, in the present embodiment, it is possible to more certainly suppress or prevent push portion 54 of a distal end portion of rod 20 catching at hinge bolt 44.

Further, since a low rigidity portion is configured by cutaway 46, manufacturing is simplified compared to a configuration in which the plate thickness is reduced or the like. Therefore, a low rigidity portion can be obtained at a low cost, and a top wall portion 30B that constitutes pushed up surface 38 of hood hinge 16 can bend smoothly by a required amount.

Further, since bending line Q is formed which extends at fixed surface 82 of top wall portion 30B of hinge arm 30 in a direction which inclines by a predetermined angle with respect to a hood front-rear direction, it is possible to increase the strength of hinge arm 30. That is, when hood 12 is opened excessively or closed with force, pushed up surface 38 of hinge arm 30 attempts to bend taking a line S (at a bolt fastening point positioned at a rearmost end), which is parallel to a rotational axis line R of hinge arm 30, as a bending line S. In contrast, in the present embodiment, since bending line Q at fixed surface 82 of hinge arm 30 intersects (is not parallel) rotational axis line R of hinge arm 30 when seen in a vehicle plane view, the attempted line of bending (the line S which is parallel with respect to the rotational axis) and bending line Q intersect. As a result, bending line Q which is not parallel with respect to rotational axis line R resists the formation of bending line S which is parallel with respect to rotational axis line R, and therefore top wall portion 30B of hinge arm 30 does not readily bend along bending line S which is parallel with respect to rotational axis line R. Therefore, it is possible to increase strength with respect to excessive opening of hood 12 or the like.

Moreover, since at an inclined direction side of pushed up surface 38 of hinge arm 30, side wall portion 30A is pulled back, even if push portion 54 of a distal end portion of rod 20 separates excessively from hinge bolt 44 owing to inclined surface 86, separation of push portion 54 of rod 20 from pushed up surface 38 is prevented by side wall portion 30A. As a result, it is possible to make push portion 54 of a distal end portion of rod 20 slide at a final or substantially final part of a predetermined sliding stroke, and thereby it is possible to suppress variations in an amount of energy absorbance. Since push portion 54 of rod 20 is prevented from separating from pushed up surface 38, the effect of preventing damage to hood 12 can also be obtained.

Further, to the extend that hinge arm 30 projects vertically at an end portion in a hood width direction at an opposite side to hinge bolt 44 of pushed up surface 38 of hinge arm 30, the rigidity of hinge arm 30 increases within the range at which side wall portion 30A is formed, however, in the present embodiment, since cutaway 46 is formed at an intermediate portion of side wall portion 30A, side wall portion 30A is certain to bend at a region at which cutaway 46 is formed.

That is, cutaway 46 becomes a point at which bending begins and predetermined bending line Q is formed as desired. As a result, the point at which bending begins is clear, and it is possible to increase accuracy with respect to the bending of top wall portion 30B of hinge arm 30 along predetermined bending line Q.

Moreover, in the present embodiment, since additional side wall portion 30C which is parallel to side wall portion 30A is formed at a hood width direction inner side of top wall portion 30B of hinge arm 30, additional side wall portion 30C can compensate for a reduction in rigidity of hinge arm 30 owing to the provision of cutaway 46 at side wall portion 30A. As a result, it is possible to obtain accurate formation of bending line Q as well as ensure the rigidity of hinge arm 30.

Variation 1 of the Fifth Embodiment

The example shown in FIG. 12 is a developmental variation in which cutaway 46 is provided where the above dimensions a, b and φ satisfy the relationship (a<φ, b<φ).

Figure 12A:
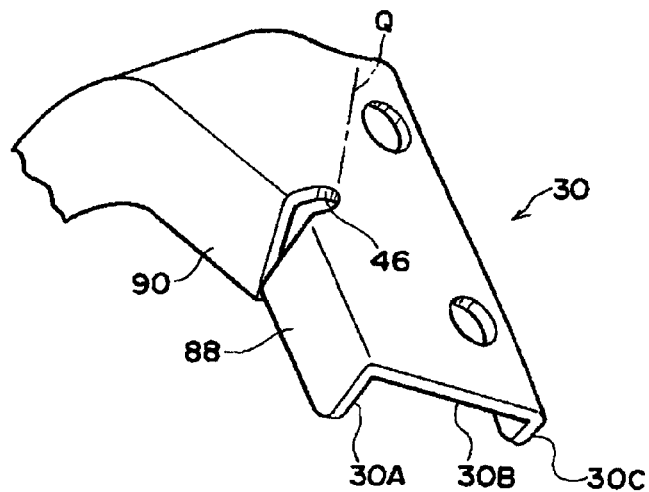
FIG. 12A is an enlarged perspective view of main elements for explaining problems when a cutaway portion is formed at a side wall portion of a hinge arm.

If a cutaway 46 is formed at side wall portion 30A in which the cutaway width a is small, then as shown in FIG. 12(A), front and rear flanges 88 and 90 which sandwich cutaway 46 are provided opposing each other, and therefore, when top wall portion 30B bends along bending line Q, respective lower end corner portions at cutaway sides of front and rear flanges 88 and 90 may interfere with each other (at an early stage) and obstruct the bending.

Figure 12B:
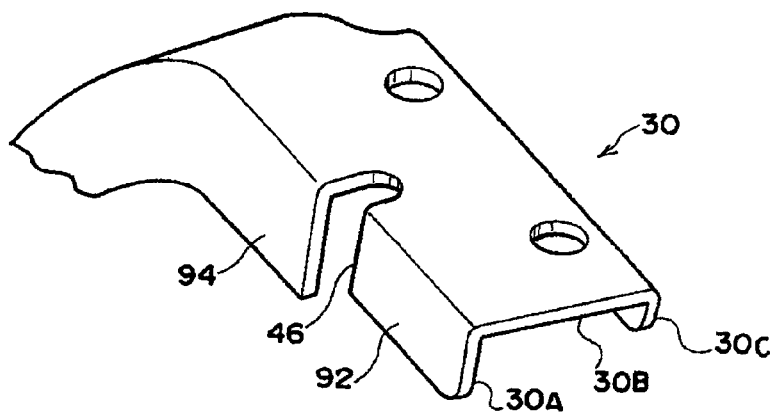
FIG. 12B is an enlarged perspective view of main elements showing a first example of a proposal for improvement (variation 1) for solving a problem when a cutaway portion is formed at a side wall portion of a hinge arm.

Thus, in the example shown in FIG. 12(B), front and rear flanges 92 and 94 that sandwich cutaway 46 are positioned to be offset in a hood width direction. With this configuration, the issue of respective lower end corner portions at cutaway sides of front and rear flanges 92 and 94 interfering with each other can be addressed. If this offset relationship is reversed, then when push portion 54 of rod 20 slides along pushed up surface 38 towards a vehicle rear side, push portion 54 may catch on the rear side flange, and therefore it is preferable to employ the offset relationship shown in FIG. 12(B).

Figure 12C:
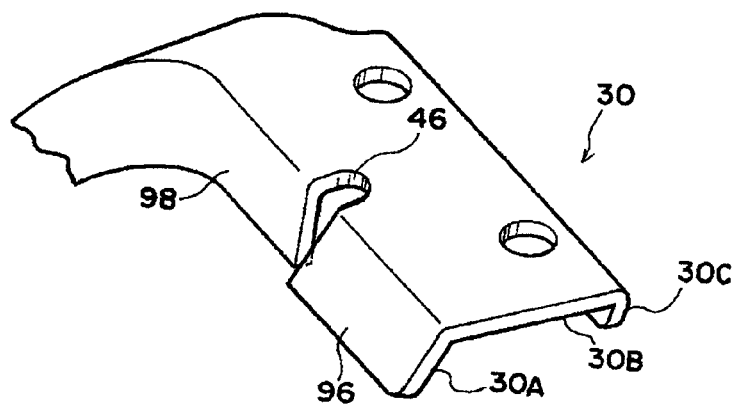
FIG. 12C is an enlarged perspective view of main elements showing a second example of a proposal for improvement (variation 1).

Further, in the example shown in FIG. 12(C), of the flanges 96 and 98 to the front and rear respectively of cutaway 46, front side flange 96 is bent in advance so as to open towards a hood width direction outer side, and when viewed from a hood front-rear direction, front side flange 96 is formed so as to intersect rear side flange 98. With this configuration, since a lower end corner portion of front side flange 96 is offset in a hood width direction with respect to a lower end corner portion of rear side flange 98, the issue of interference between respective lower end corner portions can be addressed.

Variation 2 of the Fifth Embodiment

Figure 13:
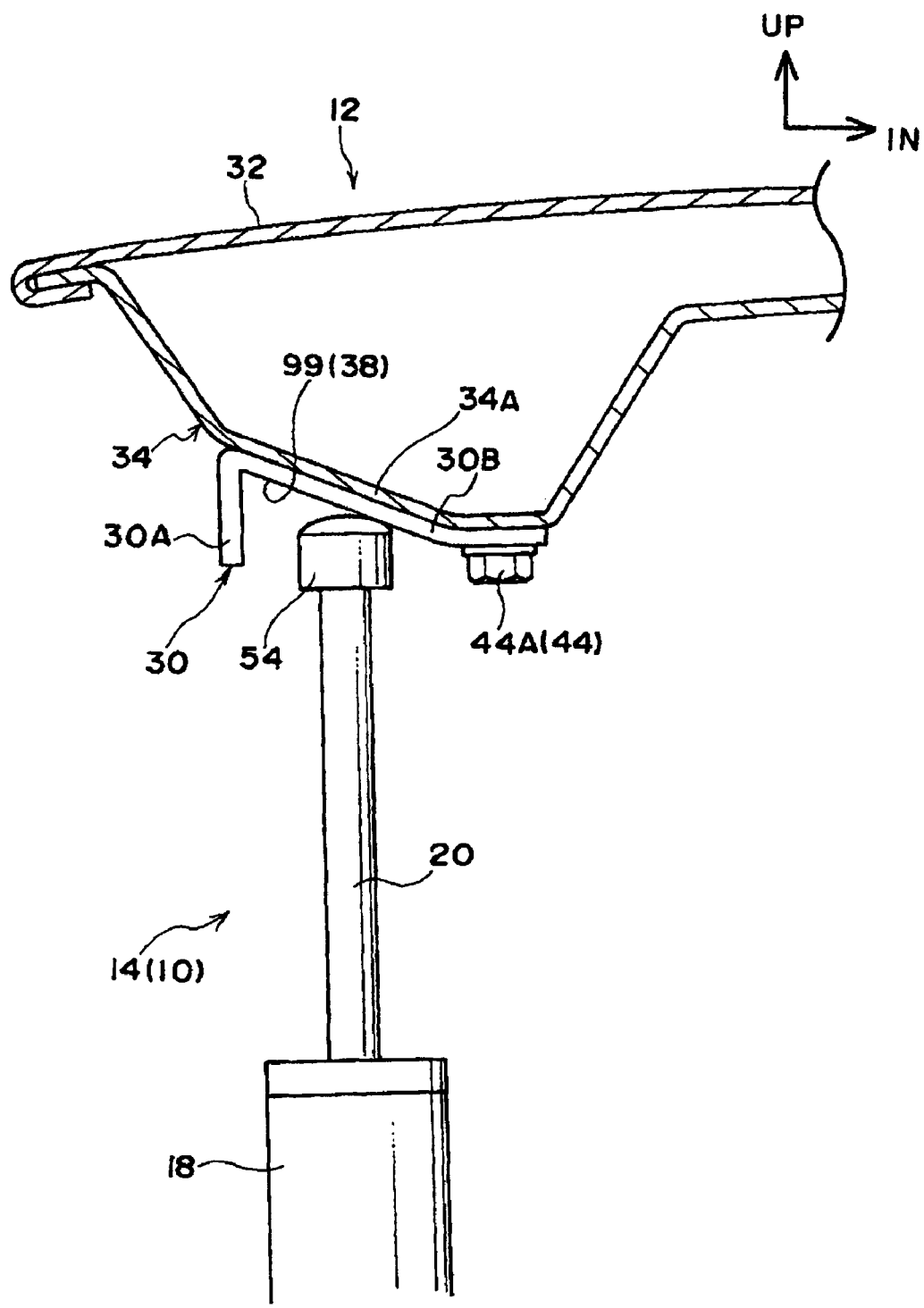
FIG. 13 is a vertical section corresponding to FIG. 11B showing a proposal for improvement (variation 2) similar to FIG. 12B and FIG. 12C.

The example shown in FIG. 13 is characterized in that inclined surface 86 is not formed at top wall portion 30B owing to the operation of a pushing up force of push portion 54 of a distal end portion of rod 20; rather, an inclined surface 99 is formed in advance at top wall portion 30B. In this example, since the abovementioned cutaway 46 is not provided at side wall portion 30A, additional side wall portion 30C at an opposite side thereto is not provided (resulting in a substantially "L" shape in cross-section when viewed from a vehicle front-rear direction).

In the above configuration, push portion 54 slides along inclined surface 99, and thereby it is possible to separate push portion 54 from bolt head portion 44A of hinge bolt 44.

Sixth Embodiment

A sixth embodiment of the vehicle pop up hood apparatus according to the present invention is explained below with reference to FIGS. 14-16.

The sixth embodiment is characterized in that a guide means is provided that guides the sliding of push portion 54 of a distal end portion of rod 20 at hinge arm 100.

Figure 14:
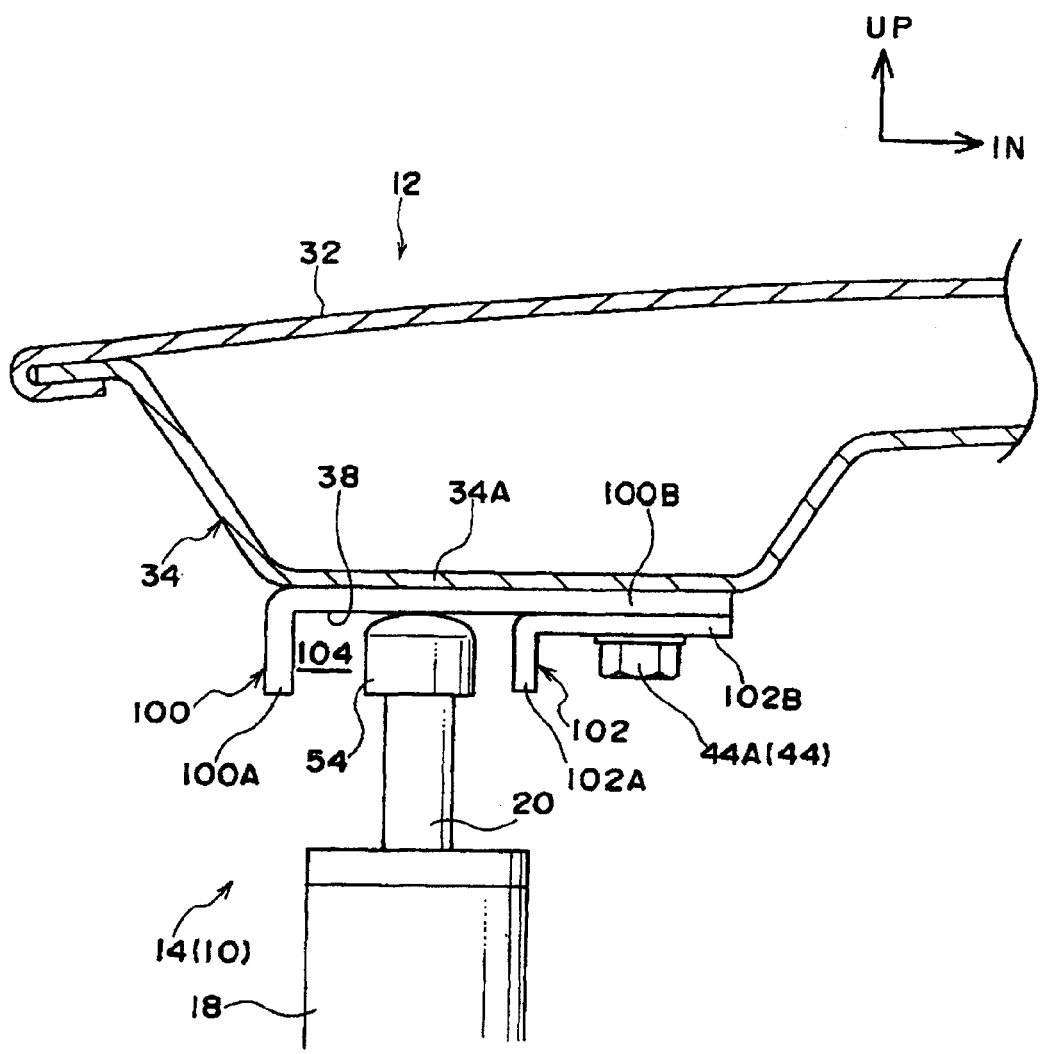
FIG. 14 is an enlarged vertical section showing main elements of a vehicle pop up hood apparatus according to a sixth embodiment.

In the example shown in FIG. 14, a cross-section of a front portion of hinge arm 100 has an "L" shape made up of a side wall portion 100A and a top wall portion 100B. A width direction dimension of top wall portion 100B approximately matches a width direction dimension of rear end expanded portion 34A of hood 12, and top wall portion 100B is provided to overlap a lower surface of rear end expanded portion 34A, and is fastened (fixed) by hinge bolt 44 together with a guide plate 102 described below. Further, in the state in which hinge arm 100 is fixed, side wall portion 100A is disposed at a hood width direction outer side.

At a lower surface of top wall portion 100B of hinge arm 100 described above, is provided guide plate 102 as a guide means, which is separate from hinge arm 100 and which is formed to have an "L" shape when viewed in a vehicle front-rear direction. Guide plate 102 also includes a side wall portion 102A as a vertical wall and a top wall portion 102B. A width direction dimension of top wall portion 102B is approximately half that of top wall portion 100B of hinge arm 100. The height of side wall portion 102A is that of side wall portion 100A of hinge arm 100, minus the plate thickness of top wall portion 100B.

Upon assembly, guide plate 102 is disposed towards a hood width direction inner side of hinge arm 100, top wall portion 102B of guide plate 102, top wall portion 100B of hinge arm 100, and rear end expanded portion 34A are stacked as three plates, and are fixed together by hinge bolt 44. After assembly, bolt head portion 44A of hinge bolt 44 is positioned at a side of top wall portion 102B of guide plate 102, and when seen from the side of the hood, bolt head portion 44A cannot be seen owing to side wall portion 102A. That is, the height of side wall portion 102A of guide plate 102 may be such that it covers bolt head portion 44A of hinge bolt 44.

Between side wall portion 100A of hinge arm 100 and side wall portion 102A of guide plate 102, is formed a locus 104 along which push portion 54 of a distal end portion of rod 20 slides.

Operation and Effects

According to the above configuration, since a vertical wall (side wall portion 102A of guide plate 102) is formed at an intermediate portion in a hood width direction of top wall portion 100B of hinge arm 100, that separates bolt head portion 44A of hinge bolt 44 and push portion 54 of rod 20, when push portion 54 of a distal end portion of rod 20 slides along pushed up surface 38 of hinge arm 100 through locus 104 towards a vehicle rear side, owing to side wall portion 102A of guide plate 102, it is possible to prevent interference between push portion 54 of rod 20 and bolt head portion 44A of hinge bolt 44. Thereby, push portion 54 of rod 20 smoothly slides along pushed up surface 38 of hinge arm 100 through locus 104 towards a vehicle rear side.

Since the above-described guide plate 102 is separate from hinge arm 100, the shape, width and length of locus 104 through which slides push portion 54 of rod 20 can be set arbitrarily. Therefore, the amount of design freedom increases. Furthermore, since guide plate 102 is fixed with hinge bolt 44 to a rear end expanded portion of hood 12, compared to a case in which it is individually and independently fixed to hinge arm 100, the number of parts can be decreased. As a result, in the present embodiment, it is possible to increase the amount of design freedom with respect to a guide means that guides the movement of push portion 54 of rod 20, and also simplify the structure.

In a variation having the above configuration, the positions of hinge arm 100 and guide plate 102 may be reversed. That is, hinge arm 100 may be a guide plate, and guide plate 102 may be a hinge arm. Even in this case, a side wall portion (side wall portion 102A) of a hinge arm becomes a separation wall for avoiding interference, and locus 104 can be obtained. To explain further, in this configuration, push portion 54 slides across pushed up surface 38 of a guide plate (hinge arm 100) towards a vehicle rear side, the guide plate corresponding to a reinforcement portion of the present invention, and since hinge bolt 44 fastens together both members, it may be understood as corresponding to a reinforcement plate fixing bolt.

Variation 1 of the Sixth Embodiment

Figure 15:
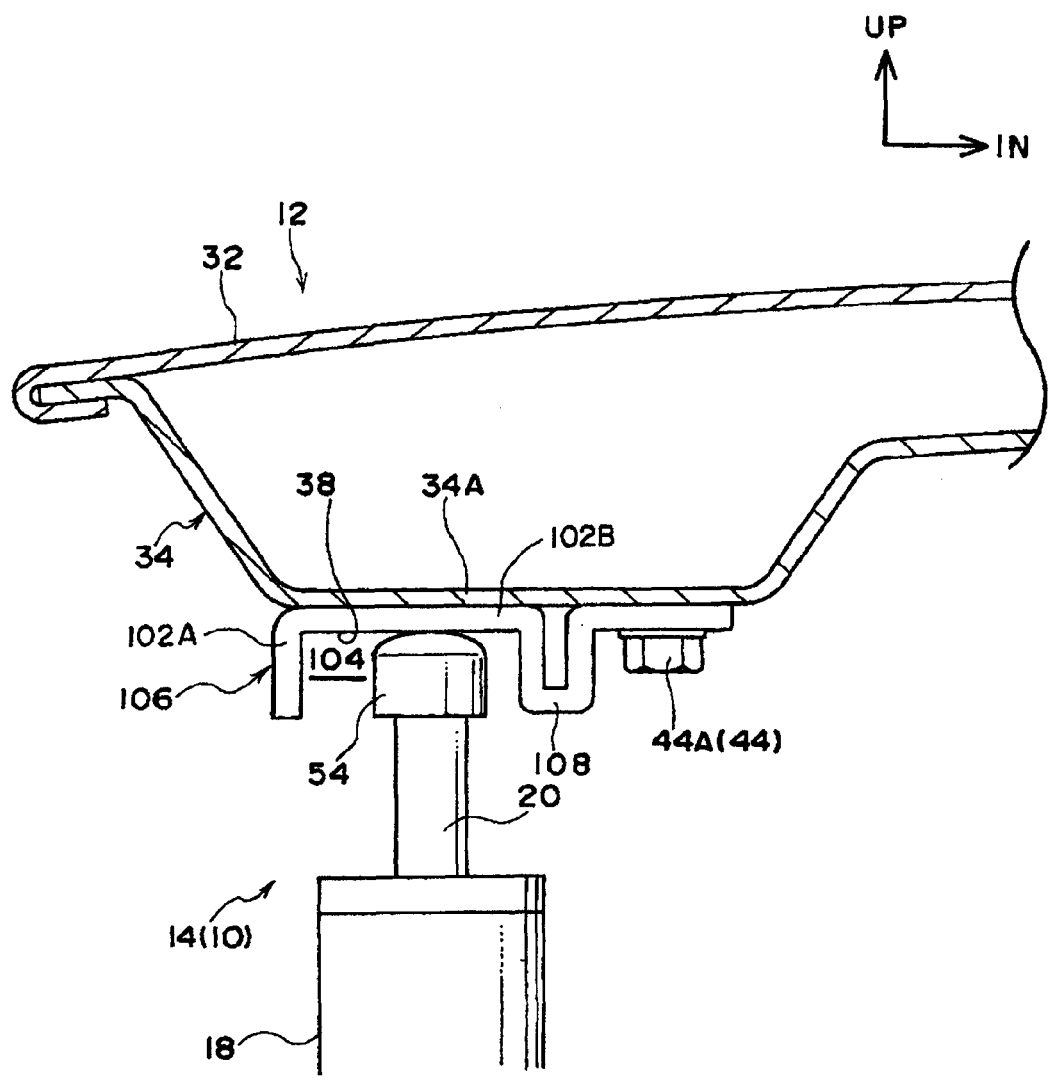
FIG. 15 is a vertical section showing main elements of variation 1 of the sixth embodiment.

The example shown in FIG. 15 is characterized in that a guide means is formed integrally with a hinge arm 106. Specifically, hinge arm 106 is formed in an "L" shape and provided with side wall portion 102A and top wall portion 102B. At an intermediate portion in a width direction of top wall portion 102B is integrally formed a projecting portion 108 as a guide means, that projects towards a hood lower side. Projecting portion 108 has a "U" shape in cross section, and is parallel with respect to side wall portion 102A. Thereby, between side wall portion 102A and projecting portion 108 at top wall portion 102B, is formed locus 104 along which push portion 54 of rod 20 slides. At a portion further towards a hood width direction inner side than projecting portion 108 of top wall portion 102B is provided a bolt fixing point of hinge bolt 44.

According to the above configuration, similar to the example shown in FIG. 14, since projecting portion 108 divides a bolt fixing surface and locus 104 of push portion 54 of rod 20, it is possible to prevent interference between push portion 54 of rod 20 and bolt head portion 44A of hinge bolt 44. Further, since projecting portion 108 is formed integrally with hinge arm 106, compared to a case in which a guide means is configured separately, it is possible to reduce the number of parts and to suppress an increase in weight, and also remove the need for an attachment operation. As a result, the present example is advantageous in that a structure can be simplified, weight can be reduced, and attachment operations do not increase.

Variation 2 of the Sixth Embodiment

Figure 16:
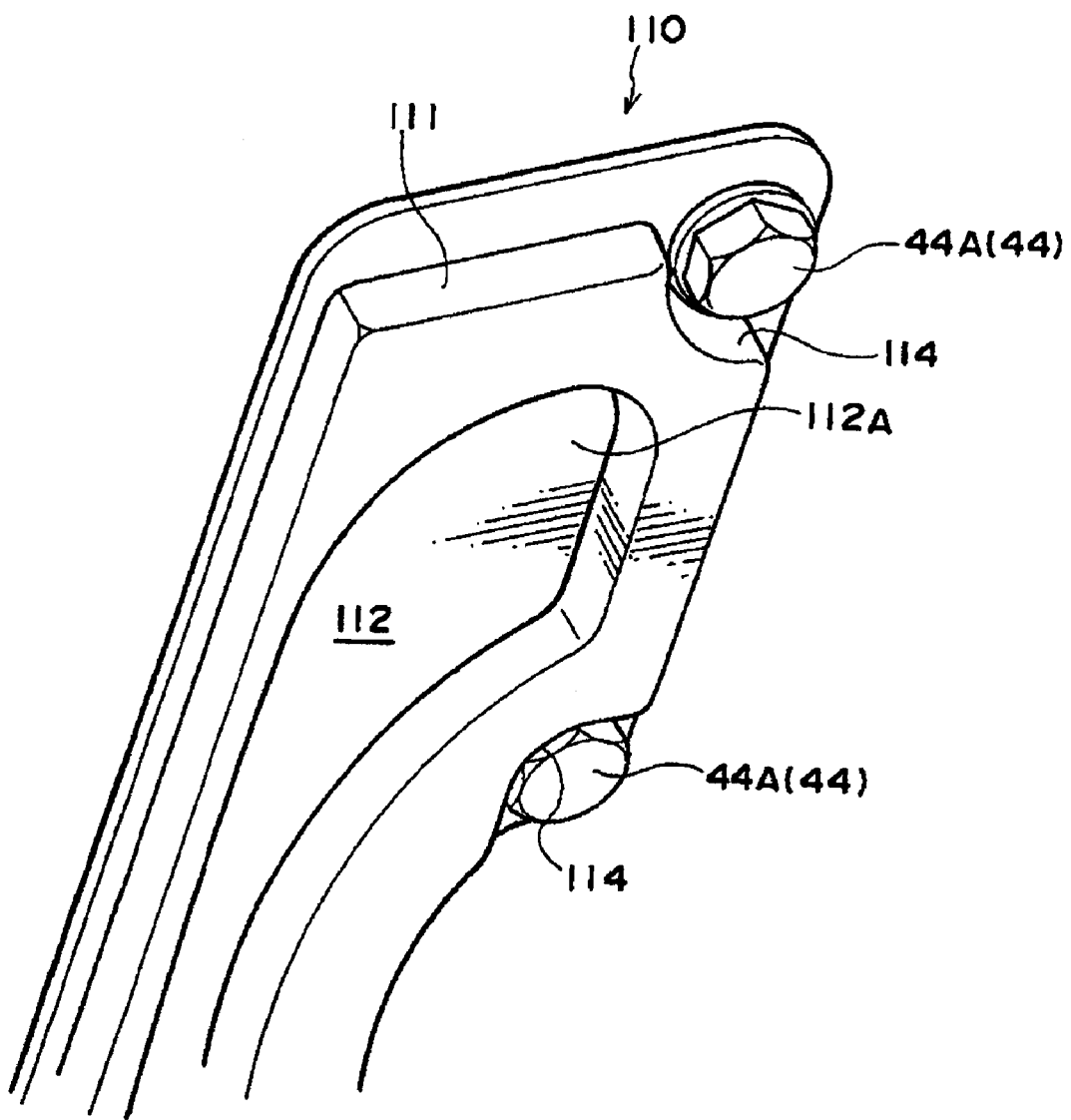
FIG. 16 is an enlarged perspective view of a part of a hinge arm showing variation 2 of the sixth embodiment.

In the example shown in FIG. 16, a resin guide plate 111 as a guide means is attached at a lower surface of a metal hinge arm 110. Resin guide plate 111 has a flat plate shape and is integrally formed with a guide groove 112 through which push portion 54 may slide. At two places to the front and rear at a hood width direction inner side of guide plate 111 are formed a pair of quarter-circle removed portions 114. A lower surface of hinge arm 110 is exposed at a portion at which removed portions 114 are formed, and at removed portions 114 hinge bolts 44 are screwed to rear end expanded portion 34A of hood 12, thereby fastening and fixing hinge arm 110 to rear end expanded portion 34A of hood 12.

An initial end portion 112A of guide groove 112 is provided between the pair of front and rear bolt fastening points. Guide groove 112 is formed to extend from initial end portion 112A gradually towards a hood width direction outer side and to continue towards a hood rear side.

In the above configuration, similar to the example shown in FIG. 14, since a bolt fastening surface and a locus of push portion 54 of rod 20 (guide groove 112) are separated owing to a non-formed portion of groove 112 of guide plate 111, interference between push portion 54 of rod 20 and bolt head portion 44A of hinge bolt 44 can be prevented.

Additionally, the width, length, depth and shape of guide groove 112, along which push portion 54 of rod 20 slides, as well as the weight of hinge arm 110, can be set arbitrarily. Therefore, design freedom can be increased. Moreover, since hinge arm 110 is made from a resin, there is not a significant increase in weight even if it is provided as a separate part. As a result, according to the present example, the level of design freedom for a guide means can be increased and weight can be reduced.

In the example shown in FIG. 16, guide plate 111 provided with groove 112 is provided separately with respect to hinge arm 110; however, if a hinge arm is made of a resin which can obtain a predetermined strength and rigidity, a projecting portion corresponding to guide plate 111 can be formed integrally with the hinge arm. In this case, compared to the configuration shown in FIG. 16, the number of parts is reduced, a weight increase can be suppressed, and an operation of attaching a guide plate is unnecessary. As a result, the present example is advantageous in that a structure can be simplified, weight can be reduced, and attachment operations do not increase.

Seventh Embodiment

Figure 17:
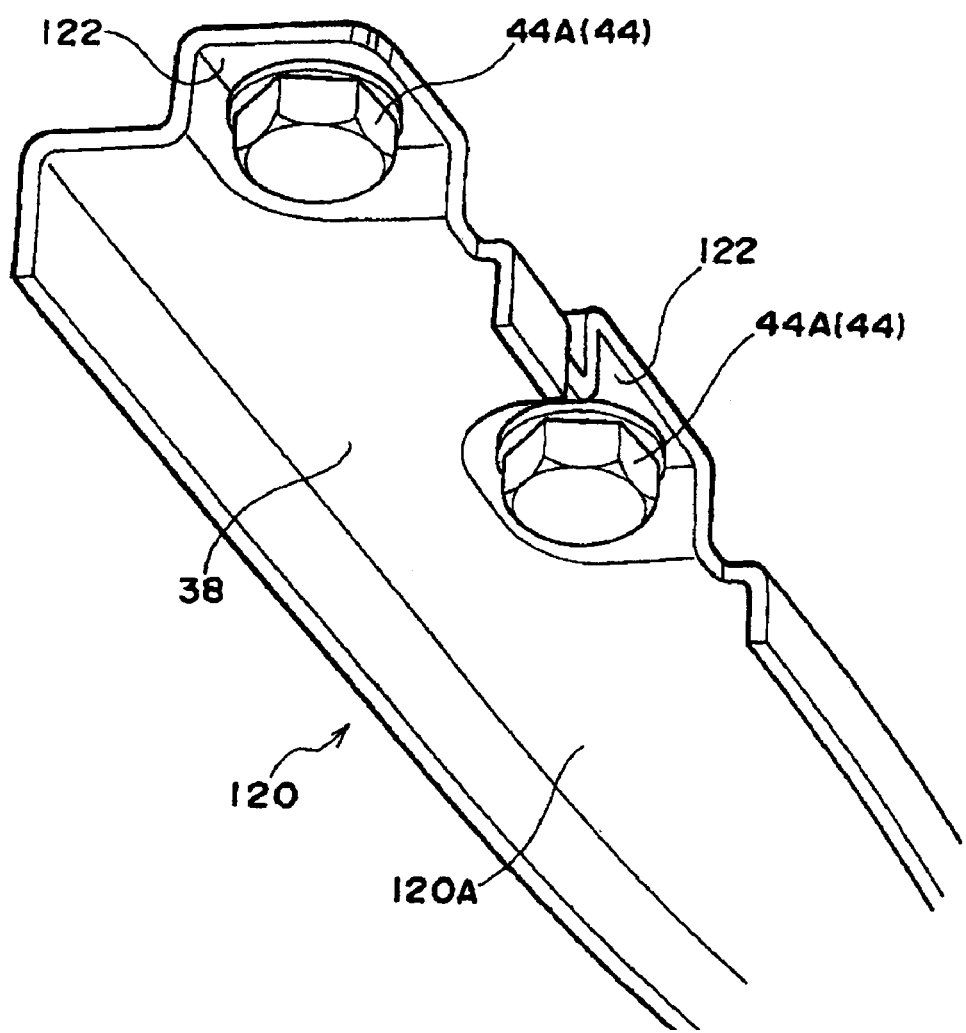
FIG. 17 is an enlarged perspective view of a part of a hinge arm, which is a main element of a pop up hood apparatus according to the seventh embodiment.

A seventh embodiment of the vehicle pop up hood apparatus according to the present invention is explained below with reference to FIG. 17.

The seventh embodiment is characterized in that a pair of recessed portions 122 that are recessed towards a hood upper side (a bolt fastening direction) are formed at a top wall portion 120A of a hinge arm 120, and bolt head portions 44A of hinge bolts 44 are accommodated in recessed portions 122. In a state after bolts are fastened, end surfaces of bolt head portions 44A of hinge bolts 44 and pushed up surface 38 of top wall portion 120A configure substantially the same surface.

Operation and Effects

According to the above configuration, when push portion 54 of rod 20 slides along pushed up surface 38 of hinge arm 120 towards a vehicle rear side, push portion 54 of rod 20 does not catch on bolt head portion 44A of hinge bolt 44. That is, since an end surface of bolt head portion 44A of hinge bolt 44 and pushed up surface 38 of top wall portion 120A configure substantially the same surface, the end surface of bolt head portion 44A functions as a part of pushed up surface 38, and push portion 54 does not catch thereon at all even if it passes thereat. As a result, the sliding of push portion 54 of rod 20 towards a vehicle rear side can occur smoothly. Thereby, rod 20 can be bent as desired, and collision energy can be efficiently absorbed.

According to the present invention, since there is no need to offset the positions of push portion 54 of rod 20 and bolt head portion 44A in a hood width direction in order to avoid interference between bolt head portion 44A of hinge bolt 44 and push portion 54, the dimensions of hinge arm 120 in a hood width direction can be reduced. As a result, hinge arm 120 can be reduced in size in a hood width direction.

Eighth Embodiment

Figure 18:
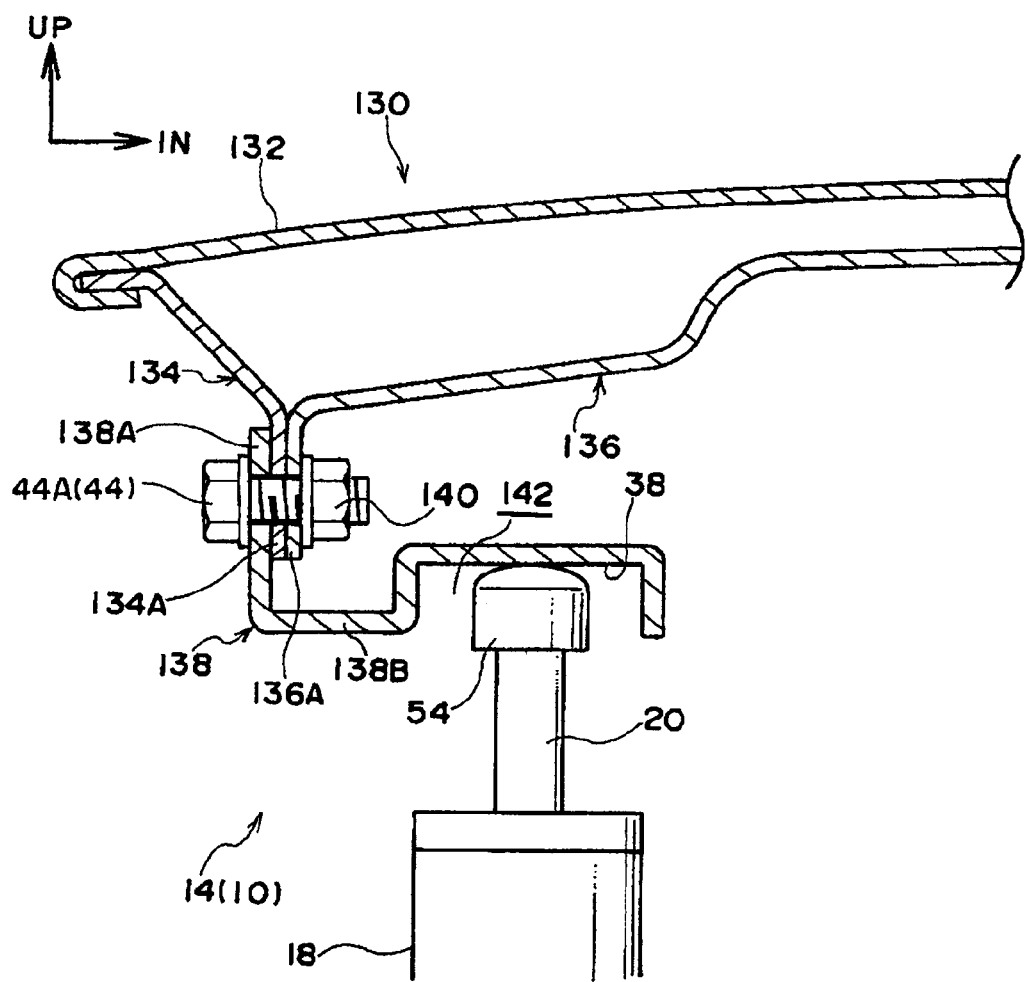
FIG. 18 is an enlarged vertical section showing an attachment structure of a hinge arm which is a main element of the pop up hood apparatus according to the eighth embodiment.

An eighth embodiment of the vehicle pop up hood apparatus according to the present invention is explained below with reference to FIG. 18.

The eighth embodiment is characterized in that a hinge arm 138 is attached at a hood rear portion side, and a direction of bolt fastening thereof is a hood width direction.

Specifically, hood 130 includes a hood outer panel 132 that constitutes a design surface, a first hood inner panel 134 and a second hood inner panel 136 which are provided at a lower surface side of hood outer panel 132 and which reinforce hood outer panel 132. That is, a inner panel has a structure divided into first hood inner panel 134 provided at a hood width direction outer side and second hood inner panel 136 provided at a hood width direction inner side. Further, an inner side terminal portion 134A of first hood inner panel 134 and an outer side terminal portion 136A of second hood inner panel 136 meet and bend down towards a hood lower side. This is an example of a hood plate assembly structure, and a different hood plate assembly structure may be employed as long as a vertical attachment base surface corresponding to inner side terminal portion 134A and outer side terminal portion 136A can be obtained therewith.

Hinge arm 138 has a substantially "L" shape in a vertical cross-section, and is provided with a vertical wall portion 138A and a horizontal wall portion 138B. Vertical wall portion 138A contacts an outer side surface in a hood width direction of inner side terminal portion 134A of first hood inner panel 134. Vertical wall portion 138A, inner side terminal portion 134A of first hood inner panel 134 and outer side terminal portion 136A of second hood inner panel 136 are stacked as three plates, and hinge bolt 44 is inserted therethrough from a hood width direction outer side and fastened by a nut 140.

Further, a hood width direction inner side of horizontal wall portion 138B lower side is bent so as to have a "U" shape in cross section that opens towards a hood lower side, and a base portion of the portion bent to have a "U" shape is a locus 142 along which push portion 54 of rod 20 slides.

Operation and Effects

According to the above configuration, since hinge arm 138 is attached to a hood rear portion side taking a hood width direction as a bolt fastening direction, when push portion 54 of rod 20 slides along pushed up surface 38 through locus 104 towards a vehicle rear side, it is possible to achieve a positional relationship in which push portion 54 of rod 20 does not interfere with hinge bolt 44. As a result, the sliding of push portion 54 of rod 20 towards a vehicle rear side can be smoothly performed. Thereby, rod 20 can be bent as desired, and therefore a collision energy can be efficiently absorbed.

Further, since hinge arm 138 is provided with vertical wall portion 138A and horizontal wall portion 138B, by employing horizontal wall portion 138B for the sliding of push portion 54 of rod 20, it is possible to employ vertical wall portion 138A as an attachment portion of hinge arm 138 with respect to a hood rear portion side. That is, it is possible to use each wall for a single purpose only. As a result, compared to a case in which the same wall has the functions of a sliding surface of push portion 54 of rod 20 and a fastening surface for a bolt, it is possible to simplify the design of hinge arm 30, and thereby, vertical wall portion 138A and horizontal wall portion 138B can be optimally designed by dividing the functions thereof.

Ninth Embodiment

A ninth embodiment of the vehicle pop up hood apparatus according to the present invention is explained below with reference to FIGS. 19 and 20.

Figure 19:
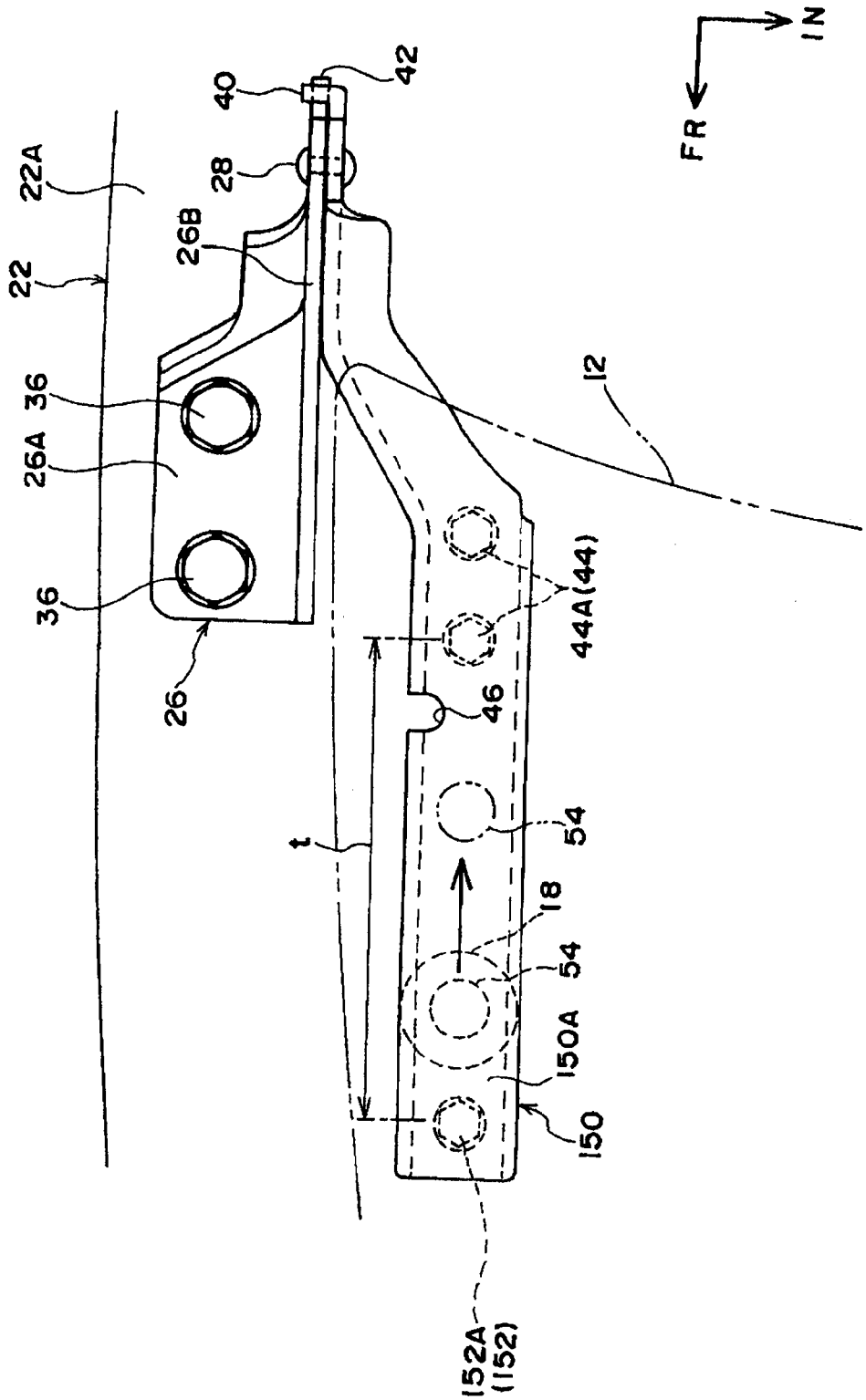
FIG. 19 is an enlarged plane view showing main elements of a pop up hood apparatus.
Figure 20:
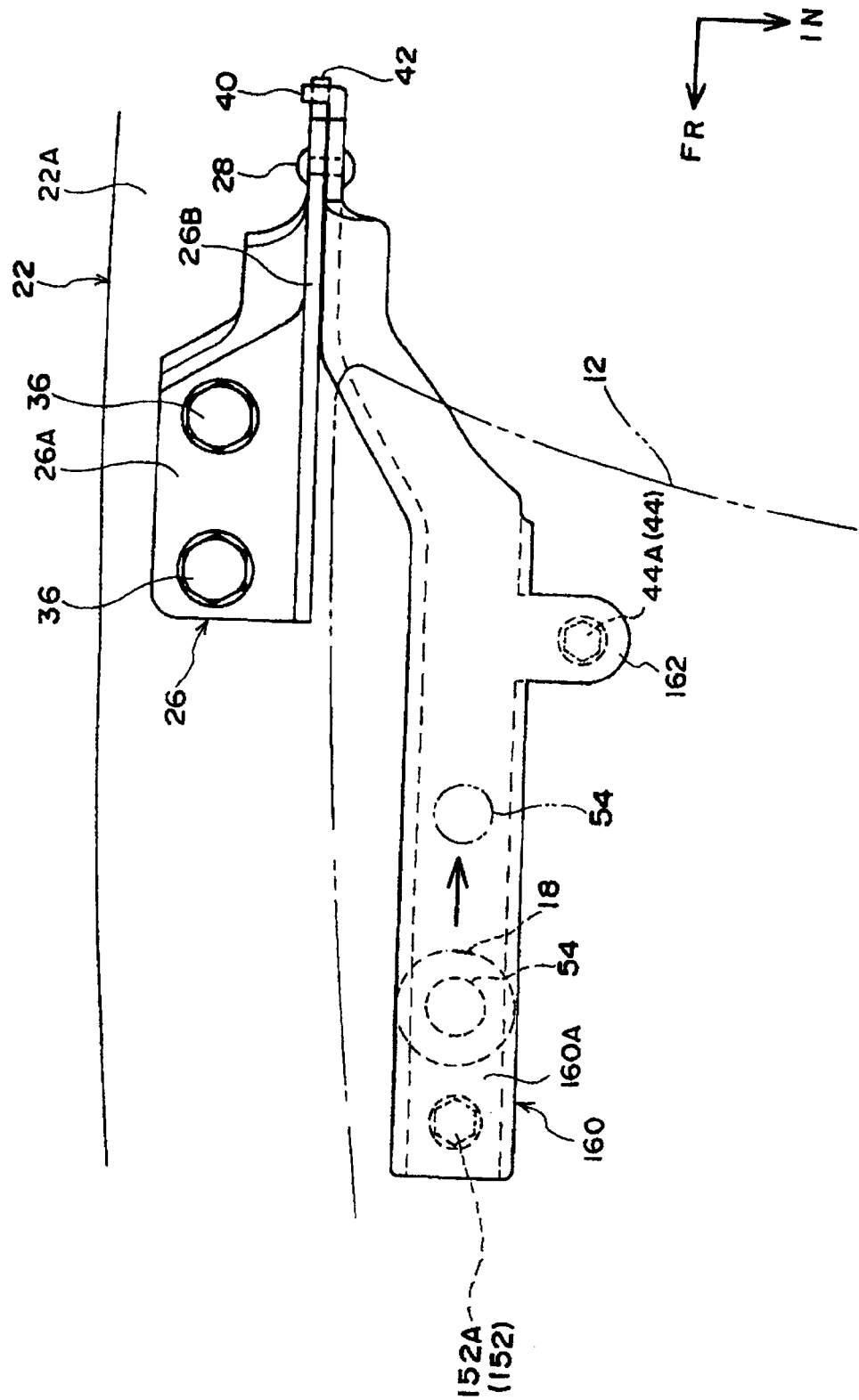
FIG. 20 is an enlarged plane view corresponding to FIG. 19 showing main elements of a variation of the embodiment shown in FIG. 19.

As shown in FIG. 19, the ninth embodiment uses a hinge arm 150 having an arm length which is long in a hood front-rear direction, and which is fastened and fixed to a hood rear end side by three hinge bolts: hinge bolt 44 (two bolts) and hinge bolt 152 (one bolt). Specifically, a front end side of hinge arm 30 used in the first embodiment described above is extended in a hood front direction, and a front end side of this extended portion 150A is provided with a third bolt fastening point. Thereby, a space increases between bolt head portion 44A of the second hinge bolt 44 and a bolt head portion 152A of hinge bolt 152 positioned at a frontmost portion, and an open portion between these two bolt fastening points is employed as pushed up surface 38 along which slides push portion 54 of rod 20. To this end, in the present embodiment, a pitch t between the second and third hinge bolts 44 and hinge bolt 152 is longer than a movement stroke of push portion 54 of rod 20.

Operation and Effects

According to the above configuration, hinge arm 150 is fixed at a hood rear portion side by plural hinge bolts 44 and hinge bolt 152 which are separated by a predetermined distance in a hood front-rear direction, and push portion 54 of rod 20 contacts a region (the region shown by a broken line of push portion 54 in FIG. 19) positioned between bolt fastening points which are adjacent in a hoot front-rear direction. Push portion 54 of rod 20 slides from the region shown by the broken line towards a vehicle rear side to a region shown by a dot-dash line. In the present embodiment, a pitch t between fastening points of bolts adjacent in a hood front-rear direction is greater than the movement stroke of push portion 54 of rod 20, and thereby push portion 54 of rod 20 slides such that at least a stroke necessary for bending rod 20 is achieved. As a result, the sliding of push portion 54 of rod 20 towards a vehicle rear side can be smoothly performed, and a desired bending of rod 20 can be achieved, and collision energy can be efficiently absorbed.

In other words, in the present embodiment, so that a necessary movement stroke of push portion 54 can be absorbed by adjusting a pitch between bolt fastening points, a hinge arm 150 having an overall length of a normal hinge arm to which has been added extended portion 150A is adopted.

Further, according to the present embodiment, since it is not necessary to offset push portion 54 of rod 20 in a vehicle width direction with respect to bolt head portion 44A and bolt head portion 152A, in order to avoid interference with bolt head portion 44A and bolt head portion 152A of hinge bolt 44 and hinge bolt 152 respectively, a hood width direction dimension of hinge arm 150 can be reduced. Thus, hinge arm 150 can be reduced in size in a hood width direction, and as a result, is advantageous for a vehicle in which the width of hinge arm 30 cannot not be large.

Moreover, in the present embodiment, since it is not necessary to perform a process such as providing a groove to hinge arm 150, the thickness of a plate is not restricted by the thickness of a formable groove portion. Thereby, the manufacture of hinge arm 150 is facilitated.

In the above configuration, a contact position of push portion 54 of rod 20 and three hinge bolts 44 (two bolts) and 152 (one bolt) is arranged on a straight line in a vehicle front-rear direction (the position of the broken line shown in FIG. 19). However, the present invention is not limited to this, and, as shown in FIG. 20, rear side hinge bolt 44 may be a single bolt, and this hinge bolt 44 may be fastened and fixed to a fixing portion 162 provided at a position offset in a hood width direction of a hinge arm 160 (in this example, an inner side). In the example shown in FIG. 20, by cutting and bending out a side wall portion at an inner side of hinge arm 160, fixing portion 162 is formed. The fastening and fixing point of front side hinge bolt 152 to an extended portion 160A, and a method of setting a pitch between a stroke and a bolt fastening point are similar to the configuration shown in FIG. 19.

The above configuration has a similar operation and similar effects to the configuration shown in FIG. 15.

Tenth Embodiment

A tenth embodiment of the vehicle pop up hood apparatus according to the present invention is explained below with reference to FIG. 21.

Figure 21:
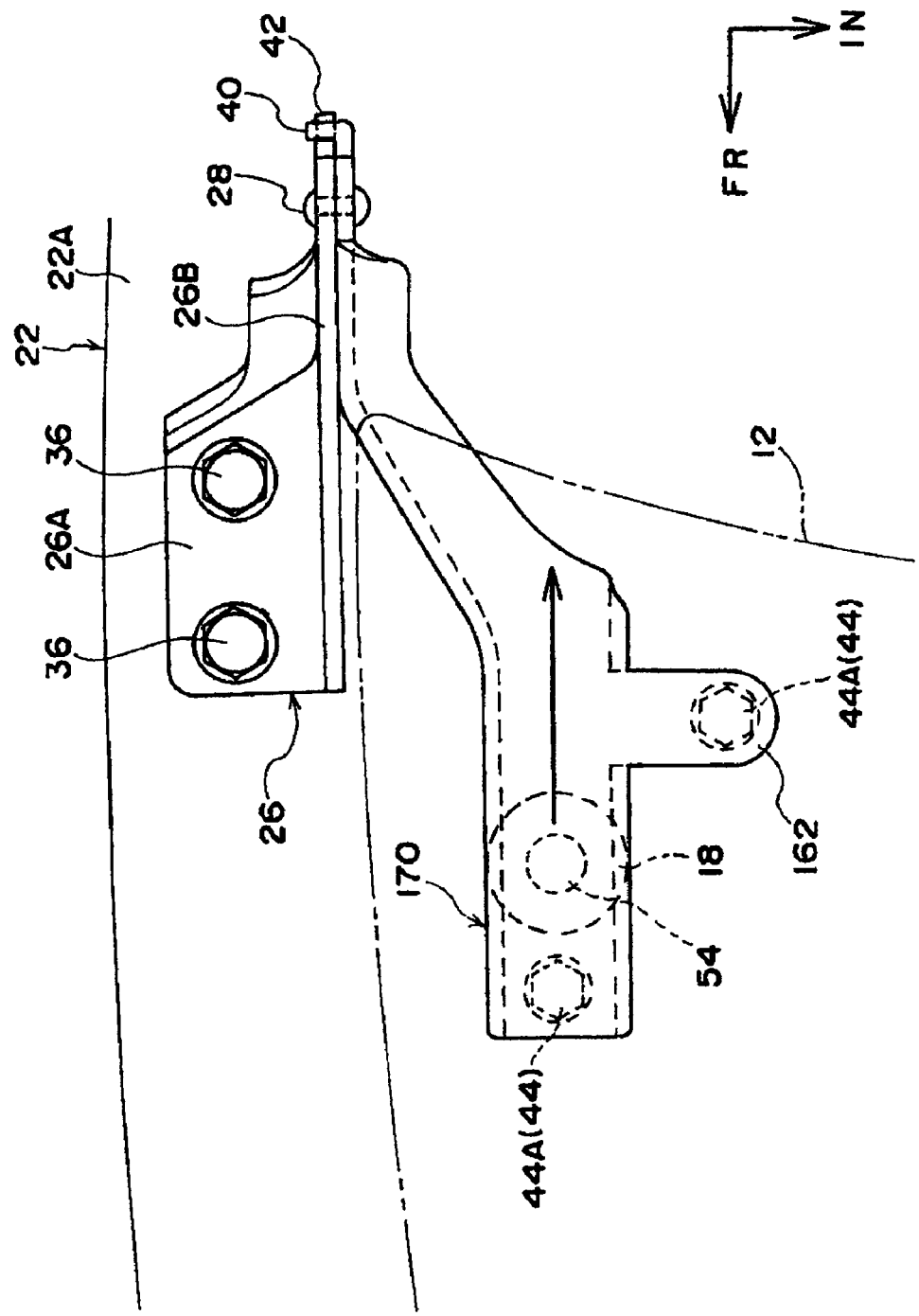
FIG. 21 is an enlarged plane view showing main elements of a pop up hood apparatus according to the tenth embodiment.

As shown in FIG. 21, the tenth embodiment is characterized in that it employs a hinge arm 170 in which extended portion 160A is not provided to hinge arm 160 of the ninth embodiment described above and shown in FIG. 20; additionally, the position of fixing portion 162 is unchanged.

More specifically, a width direction dimension of hinge arm 170 is identical to a width direction dimension of hinge arm 160. Further, at a hood rear direction side of a front side of hinge bolt 44, is provided a pushed up position which is pushed up by push portion 54 (the position of the broken line), and push portion 54 slides past a bolt fastening point of rear side hinge bolt 44, and towards a vehicle rear side.

Operation and Effects

According to the above configuration, push portion 54 contacts a vehicle rear side of a bolt fastening point of front side hinge bolt 44 of hinge arm 170, and from there slides towards a vehicle rear side. Push portion 54 slides past a bolt fastening point of rear side hinge bolt 44, and since rear side hinge bolt 44 is fastened at fixing portion 162 which extends towards a vehicle width direction inner side, rear side hinge bolt 44 is not present on the movement locus of push portion 54. As a result, push portion 54 can slide past bolt head portion 44A of rear side hinge bolt 44 without interfering therewith. Thereby, sliding of push portion 54 of rod 20 towards a vehicle rear side can be performed smoothly, rod 20 can be bent as desired, and a collision energy can be efficiently absorbed.

In the present embodiment, although a space can be ensured for a bolt fastening point of front side hinge bolt 44, a bolt fastening point of rear side hinge bolt 44 cannot be positioned on substantially the same line in a hood front-rear direction that passes through the bolt fastening point of front hinge bolt 44; therefore, this embodiment is advantageous in a vehicle in which space in a hood width direction can be ensured.

Supplementary Explanation of the Above Embodiments (1) In the above embodiments, hood hinge 16 is fixed at a cowl top side; however, the invention is not limited to this, and a hood hinge may be fixed at a vehicle body side structural member, such as an upper apron member.

(2) In the above embodiments, a configuration is adopted in which rod 20 pushes up a rear end side of hood 12; however, the invention is not limited to this, and a rod may push up a hood rear portion side. That is, the "hood rear portion side" of the present invention indicates a portion positioned further to a vehicle rear side than an intermediate portion in a hood front-rear direction. Preferably, a portion at from a hood rear end to ⅓ of the length of the entire hood is pushed up. An intermediate portion in a hood front-rear direction is not included because a hood bending bead may be disposed at an intermediate portion in a hood front-rear direction, and if this portion is pushed towards at hood upper side the hood may bend and deform, and the rear end side of the hood may not rise.

What is claimed is:

1. A vehicle pop up hood apparatus, comprising:
an actuator mounted to a vehicle;
a rod that extends towards a hood upper side owing to the operation of the actuator, pushes up, towards a hood upper side, a hood rear portion side which is supported so as to be able to open and close with respect to a vehicle body side via a hood hinge, and maintains the hood at the pushed up position, a reinforcement member provided at a contact region at the hood rear portion side that a distal end portion of the rod contacts, that extends in a vehicle front-rear direction along a lower surface of a hood rear end side, reinforces the contact region, and is provided with a pushed-up surface disposed in parallel with a hood rear end expanded portion, and an energy absorbing mechanism in which, when the hood is in a pushed up state, and a collision load of a predetermined value or greater acts from a hood upper side to near a pushed up region of the hood which is pushed up by the rod, a distal end portion of the rod slides along the pushed up surface of the reinforcement member towards a vehicle rear side while the rod is made to bend, thereby absorbing collision energy.

2. The vehicle pop up hood apparatus according to claim 1, wherein
the reinforcement member is fixed to the hood rear portion side by a reinforcement member fixing bolt, and all or part of the pushed up surface of the reinforcement member is inclined in a hood width direction such that, when the distal end portion of the rod slides along the pushed up surface towards a vehicle rear side, the distal end portion of the rod slides in a direction of separation away from the reinforcement member fixing bolt.

3. The vehicle pop up hood apparatus of claim 1, wherein
the reinforcement member is fixed to the hood rear portion side by a reinforcement member fixing bolt, and with respect to all or part of the pushed up surface of the reinforcement member, owing to the distal end portion of the rod sliding towards a vehicle rear side along a bending surface bent by the operation of a pushing up force when the distal end portion of the rod pushes up the pushed up surface, the distal end portion of the rod separates away from the reinforcement member fixing bolt.

4. The vehicle pop up hood apparatus of claim 3, wherein the pushed up surface is a pushed up surface of a hinge arm of a hood hinge fixed by a hinge bolt at one end thereof to a hood rear portion side, and
the bending line is not parallel to a rotational axis line of the hinge arm when seen in a vehicle plane view.

5. The vehicle pop up hood apparatus of claim 1, wherein when the pushed up state of the hood is seen from a vehicle side, an angle θ, between an axis line of the rod that pushes up a hood rear portion side and a pushed up surface at a hood rear portion side that a distal end portion of the rod contacts, is from 95° to 140°.

6. The vehicle pop up hood apparatus of claim 1, wherein
the distal end portion of the rod is provided with an inclined surface that inclines at the same angle as an angle of inclination of a pushed up surface of the hood rear portion side when the actuator is not operated.

7. The vehicle pop up hood apparatus of claim 1, wherein the reinforcement member is a hinge arm of a hood hinge fixed by a hinge bolt at one end thereof to a hood rear portion side, and
the pushing up position of the hood rear portion side by the distal end portion of the rod is offset such that it does not overlap with the hinge bolt in a hood width direction.

8. The vehicle pop up hood apparatus of claim 7, wherein the hinge bolt is positioned at a hood width direction inner side of the pushed up surface of the hinge arm, and a flange that extends in a hood front-rear direction is provided at an end portion at a hood width direction outer side of the pushed up surface.

9. The vehicle pop up hood apparatus of claim 8, wherein a low rigidity portion that weakens the flange is provided at an intermediate portion of the flange.

10. The vehicle pop up hood apparatus of claim 9, wherein the low rigidity portion is a cutaway that is cut away from a lower edge side to an upper edge side of the flange, so as to extend over a ridge portion.

11. The vehicle pop up hood apparatus of claim 9, wherein at an end portion at a hood width direction inner side of the pushed up surface of the hinge arm is provided a second flange that extends in a hood front-rear direction.

12. The vehicle pop up hood apparatus of claim 11, wherein another low rigidity portion separate from the low rigidity portion is formed at or near to a rear end portion of the second flange, and a line segment that connects the low rigidity portion and the another low rigidity portion bends as a bending line.

13. The vehicle pop up hood apparatus of claim 9, wherein the low rigidity portion is a cutaway, and
a pair of front and rear flanges that sandwich the cutaway are provided such that they are offset in a hood width direction, or such that one of the flanges crosses the other flange when seen from a hood front-rear direction.

14. The vehicle pop up hood apparatus of claim 9 wherein the low rigidity portion is a cutaway formed so as to extend to a ridge portion positioned at a base side of the flange.

15. The vehicle pop up hood apparatus of claim 7, wherein at the pushed up surface of the hinge arm, is provided a guide means that guides a movement of the distal end portion of the rod such that the distal end portion of the rod does not interfere with the hinge bolt when the distal end portion of the rod slides along the pushed up surface towards a vehicle rear side.

16. The vehicle pop up hood apparatus of claim 15, wherein the guide means is a guide plate which is separate from the hinge arm, fastened to the hood using the hinge bolt, and has a vertical wall that extends along a hood vertical direction and that separates a movement path of the distal end portion of the rod from the hinge bolt.

17. The vehicle pop up hood apparatus of claim 15, wherein the guide means is a projecting portion formed integrally with the hinge arm, that projects towards a hood lower direction and separates a movement path of the distal end portion of the rod from the hinge bolt.

18. The vehicle pop up hood apparatus of claim 15, wherein the guide means is a resin guide plate fixed to a lower surface of the hinge arm that includes a guide groove along which the distal end portion of the rod can slide.

19. The vehicle pop up hood apparatus of claim 7, wherein
at the hinge arm is formed a recessed portion recessed in a bolt fastening direction of the hinge bolt, and
in a state after bolt fastening, a pushed up surface of the hinge arm, and an end surface of a bolt head portion accommodated in the recessed portion, are the same surface.

20. The vehicle pop up hood apparatus of claim 7, wherein the hinge arm is attached to a hood rear portion side with a hood width direction as a bolt fastening direction.

21. The vehicle pop up hood apparatus of claim 20, wherein the hinge arm further comprises:
a horizontal wall arranged in parallel with a lower surface of a hood rear portion side and along which a distal end portion of a rod slides, and a vertical wall which is vertical with respect to a lower surface of a hood rear portion side and which is a bolt fastening portion.

22. The vehicle pop up hood apparatus of claim 1, wherein the hood hinge is fixed to a cowl top side.

23. The vehicle pop up hood apparatus of claim 1, wherein
the reinforcement member is a reinforcement plate configured separately from a hood hinge and fixed by a reinforcement plate fixing bolt to a hood rear portion side, and
the pushing up position of the hood rear portion side by the distal end portion of the rod is offset such that it does not overlap with the reinforcement plate fixing bolt in a hood width direction.

24. The vehicle pop up hood apparatus of claim 23, wherein the reinforcement plate fixing bolt is positioned at a hood width direction inner side of the pushed up surface of the reinforcement plate, and a flange that extends in a hood front-rear direction is provided at an end portion at a hood width direction outer side of the pushed up surface.

25. The vehicle pop up hood apparatus of claim 24, wherein a low rigidity portion that weakens the flange is provided at an intermediate portion of the flange.

26. The vehicle pop up hood apparatus of claim 25, wherein the low rigidity portion is a cutaway that is cut away from a lower edge side to an upper edge side of the flange, so as to extend over a ridge portion.

27. The vehicle pop up hood apparatus of claim 25, wherein at an end portion at a hood width direction inner side of the pushed up surface of the reinforcement plate is provided a second flange that extends in a hood front-rear direction.

28. The vehicle pop up hood apparatus of claim 27, wherein another low rigidity portion separate from the low rigidity portion is formed at or near to a rear end portion of the second flange, and a line segment that connects the low rigidity portion and the another low rigidity portion bends as a bending line.

29. The vehicle pop up hood apparatus of claim 25 wherein the low rigidity portion is a cutaway formed so as to extend to a ridge portion positioned at a base side of the flange.

30. The vehicle pop up hood apparatus of claim 25, wherein the low rigidity portion is a cutaway, and
a pair of front and rear flanges that sandwich the cutaway are provided such that they are offset in a hood width direction, or such that one of the flanges crosses the other flange when seen from a hood front-rear direction.

31. The vehicle pop up hood apparatus of claim 23, wherein at the pushed up surface of the reinforcement plate, is provided a guide means that guides a movement of the distal end portion of the rod such that the distal end portion of the rod does not interfere with the reinforcement plate bolt when the distal end portion of the rod slides along the pushed up surface towards a vehicle rear side.

32. The vehicle pop up hood apparatus of claim 31, wherein the guide means is a guide plate which is separate from the reinforcement plate, fastened to the hood using the reinforcement plate fixing bolt, and has a vertical wall that extends along a hood vertical direction and that separates a movement path of the distal end portion of the rod from the reinforcement plate fixing bolt.

33. The vehicle pop up hood apparatus of claim 31, wherein the guide means is a projecting portion formed integrally with the reinforcement plate, that projects towards a hood lower direction and separates a movement path of the distal end portion of the rod from the reinforcement plate fixing bolt.

34. The vehicle pop up hood apparatus of claim 31, wherein the guide means is a resin guide plate fixed to a lower surface of the reinforcement plate that includes a guide groove along which the distal end portion of the rod can slide.

35. The vehicle pop up hood apparatus of claim 23, wherein
at the reinforcement plate is formed a recessed portion recessed in a bolt fastening direction of the reinforcement plate fixing bolt, and
in a state after bolt fastening, a pushed up surface of the reinforcement plate, and an end surface of a bolt head portion accommodated in the recessed portion, are the same surface.

36. The vehicle pop up hood apparatus of claim 23, wherein the reinforcement plate is attached to a hood rear portion side with a hood width direction as a bolt fastening direction.

37. The vehicle pop up hood apparatus of claim 36, wherein the reinforcement plate further comprises:
a horizontal wall arranged in parallel with a lower surface of a hood rear portion side and along which a distal end portion of a rod slides, and
a vertical wall which is vertical with respect to a lower surface of a hood rear portion side and which is a bolt fastening portion.

38. The vehicle pop up hood apparatus of claim 23, wherein at the reinforcement plate, the distal end portion of the rod includes an interference avoiding structure or an interference avoiding means with respect to a head portion of the reinforcement plate fixing bolt when the distal end portion of the rod slides along the pushed up surface.

39. The vehicle pop up hood apparatus of claim 1, wherein
the reinforcement member is a hinge arm of a hood hinge or a reinforcement plate configured separately from a hood hinge,
the hinge arm or the reinforcement plate is fastened to a hood rear portion side by plural hinge bolts or reinforcement plate fixing bolts arranged separated by a predetermined spacing in a hood front-rear direction,
the distal end portion of the rod contacts a region positioned between neighboring bolt fastening points in a hood front-rear direction, and
a movement stroke of the distal end portion of the rod is included between neighboring bolt fastening points in the vehicle front-rear direction.

40. The vehicle pop up hood apparatus of claim 39, wherein the plural bolt fastening points are arranged in a vehicle front-rear direction along a straight line.

41. The vehicle pop up hood apparatus of claim 1, wherein
the reinforcement member is a hinge arm of a hood hinge or a reinforcement plate configured separately from a hood hinge;
the hinge arm or the reinforcement plate is fastened to a hood rear portion side by plural hinge bolts or reinforcement plate fixing bolts arranged separated by a predetermined spacing in a hood front-rear direction;
the distal end portion of the rod contacts a region positioned between neighboring bolt fastening points in a hood front-rear direction, and slides past a rear side bolt fastening point towards a vehicle rear side, and
the rear side bolt fastening point is offset in a hood width direction with respect to a front side bolt fastening point.

42. The vehicle pop up hood apparatus of claim 7, wherein at the hinge arm, the distal end portion of the rod includes an interference avoiding structure or an interference avoiding means with respect to a head portion of the hinge bolt when the distal end portion of the rod slides along the pushed up surface.

* * * * *